US012781842B1

(12) United States Patent
Maffei et al.

(10) Patent No.: US 12,781,842 B1
(45) Date of Patent: Nov. 3, 2026

(54) DIFFERENTIAL CROWN LOCKING INTERFACE

(71) Applicant: DANA ITALIA S.R.L., Arco (IT)

(72) Inventors: Claudio Maffei, Arco (IT); Davide Deimichei, Ala (IT); Alessandro Strauss, Rovereto (IT); Gianluca Terrasi, Arco (IT); Mario Bonora, Tenno (IT); Parag Mahajan, Pune (IN)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 19/219,594

(22) Filed: May 27, 2025

(51) Int. Cl.

*F16H 48/40* (2012.01)
*F16D 1/112* (2006.01)
*F16H 48/08* (2006.01)
*F16H 57/04* (2010.01)
*F16D 1/10* (2006.01)
*F16H 48/38* (2012.01)

(52) U.S. Cl.

CPC ............. *F16H 48/40* (2013.01); *F16D 1/112* (2013.01); *F16H 48/08* (2013.01); *F16H 57/043* (2013.01); *F16H 57/0483* (2013.01); *F16D 2001/103* (2013.01); *F16H 2048/385* (2013.01); *F16H 2048/405* (2013.01)

(58) Field of Classification Search

CPC ............... F16H 48/40; F16H 2048/385; F16H 2048/405; F16H 48/08; F16H 57/043; F16H 57/0483; F16D 1/112; F16D 2001/103

See application file for complete search history.

(56) References Cited

U.S. PATENT DOCUMENTS

| | | | | |
|---|---|---|---|---|
| 6,068,571 A * | 5/2000 | Irwin | F16H 55/20 74/606 R |
| 8,015,899 B2 | 9/2011 | Gianone et al. | |
| 10,391,861 B2 * | 8/2019 | Richards | F16H 48/38 |
| 10,941,846 B2 * | 3/2021 | Raya | F16H 48/38 |
| 11,649,884 B1 * | 5/2023 | Verbridge | F16H 57/0457 475/160 |
| 12,117,073 B1 * | 10/2024 | Lee | F16H 48/08 |
| 2010/0075795 A1 | 3/2010 | Krude et al. | |

(Continued)

FOREIGN PATENT DOCUMENTS

| | | |
|---|---|---|
| DE | 10136818 A1 | 2/2003 |
| DE | 102006010187 A1 | 9/2007 |
| WO | 2020193027 A1 | 10/2020 |

OTHER PUBLICATIONS

"How a Differential Works | Types of Differentials Explained," Youtube Website, Available Online at https://www.youtube.com/watch?v=SvDcSFwyJhY&t=100s, Feb. 6, 2022, 2 pages.

*Primary Examiner* — Farhana Pervin
(74) *Attorney, Agent, or Firm* — McCoy Russell LLP

(57) ABSTRACT

The disclosure provides support for a differential assembly comprising part of a drive axle and comprising: a housing comprising a first portion and a second portion axially protruding from the first portion, and a crown gear fixed to the first portion of the housing via a plurality of fasteners and fixed to the second portion of the housing via a splined-slotted interface or a protrusion-slotted interface between an inner diameter of the crown gear and an outer diameter of the second portion of the housing, where the crown gear is physically decoupled from the drive shaft.

17 Claims, 9 Drawing Sheets

(56) References Cited

U.S. PATENT DOCUMENTS

| | | | | |
|---|---|---|---|---|
| 2011/0263372 | A1* | 10/2011 | Kimura | F16H 57/0483 475/160 |
| 2014/0302961 | A1* | 10/2014 | Downs | F16C 33/581 475/230 |
| 2017/0198799 | A1* | 7/2017 | Downs | B60K 17/165 |
| 2020/0346544 | A1* | 11/2020 | Ekonen | B60K 17/346 |
| 2022/0196129 | A1* | 6/2022 | Downs | F16H 48/22 |
| 2022/0290751 | A1* | 9/2022 | Ravasi | F16H 48/40 |
| 2023/0137429 | A1* | 5/2023 | Nakata | H02K 9/19 310/54 |
| 2025/0243928 | A1* | 7/2025 | Kishimoto | F16H 57/0424 |
| 2025/0361931 | A1* | 11/2025 | Ekonen | F16H 48/38 |

* cited by examiner

DIFFERENTIAL CROWN LOCKING INTERFACE

TECHNICAL FIELD

The present description relates to differential with a crown wheel and a differential housing. More particularly, the description relates to a plurality of interfaces and features thereof for locking the crown wheel to the differential housing.

BACKGROUND AND SUMMARY

Vehicle drivelines may receive mechanical power from an engine, an electric machine, and/or other examples of movers in different powertrain architectures. Some drivelines have made use of differentials to transfer rotational energy, such as torque, from a mover to wheels in vehicles. More specifically, steering differential may distribute torque in unequal quantities to separate drive wheels of the vehicle, such as via axle shafts of a drive axle. One or more steering differentials may include a differential housing (e.g., a central differential housing such as a differential case) that may house and rotate a plurality of differential gears and side gears. An input gear may be rigidly coupled to the differential housing of the differential, such that torque from a pinion gear may rotate, drive, and transfer rotational energy to the differential housing, therein driving the other gears of the differential. The input gear may be a ring gear and, more specifically, of a crown configuration, such as a crown wheel or a crown gear.

The inventors have recognized several issues with systems of rigidly coupling the crown and the differential housing. The crown gear may be fixed and rigidly coupled to the differential housing with fasteners, such as only screws or bolts. Using fasteners as a solution may not be as robust at higher torques due to fretting, bending, and/or other forms of degradation to screws, bolts, or similar fasteners. While increasing the number of fasteners may decrease the force placed on each, the number of screws to fasten the crown to the differential housing may be limited by the available space on the gear surface, therefore also the transmittable torque is limited to below a desired threshold of torque. Increasing the area of the gear surface may increase the weight or complexity of the shape of the crown gear, leading to power losses or increased degradation from the weight or shape of the crown gear. The number of the screws also affect the assembly and components cost and timing, and there is a desire to decrease material costs and manufacturing time.

Alternatively, the crown gear may be welded to one or more components of the differential. However, if welded, the crown gear may be difficult to decouple from the housing. Likewise, other components of the differential may be difficult to remove from a drive axle or decouple from the differential such as to access gears or other rotating elements housed and/or supported via the housing.

To address the abovementioned challenges, the inventors developed a differential assembly and differential thereof. A first example includes a differential assembly comprising: a housing further comprising: a first portion and a second portion axially protruding from the first portion; a crown gear, where the crown gear is fixed to the first portion of the housing via a plurality of fasteners and fixed to the second portion of the housing via a splined interface between an inner diameter of the ring gear and an outer diameter of the second portion of the housing; and a driveshaft, where the ring gear is physically decoupled from the driveshaft.

A second example includes a differential assembly comprising: a housing comprising a first portion and a second portion axially protruding from the first portion; and a ring gear, where the ring gear is fixed to the second portion of the housing via a protrusion-slotted interface between an inner diameter of the ring gear and an outer diameter of the second portion of the housing, where the protrusion-slotted interface includes a plurality of protrusions protruding axially and a plurality of first slots, the protrusions extending into and locking with the first slots; and a driveshaft, where the ring gear is physically decoupled from the driveshaft.

The protrusions may be rigidly coupled to second portion and the ring gear may include the slots. Further, the protrusions may be joined or be a part of (e.g., be formed or machined from) the second portion. The protrusions may be rigidly coupled to the ring gear and the second portion may include the slots. Further, the protrusions may be joined or be a part of (e.g., be formed or machined from) the ring gear.

The locking interfaces may increase the maximum torque transferable between the ring gear and the differential housing to above a desired threshold of torque. Further, the increase may be dependent on the stress on the differential gears (e.g., differential bevel gears) of the differential, and not the strength and number of fasteners rigidly coupling the ring gear to the differential housing. The connection between the ring gear and the differential housing further may have an increased robustness compared to prior connections using fasteners. Further a welding process and a weld created thereby may be absent from the manufacturing method that would increase the cost of the components and increase the duration of the assembly process. The number of the screws may be approximately reduced below a desired amount and the power density transmittable may be increased above another threshold of power. As a consequence, the risk of fretting may be reduced. Further, less screws may reduce assembly time and cost of components and materials for assembling the differential.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
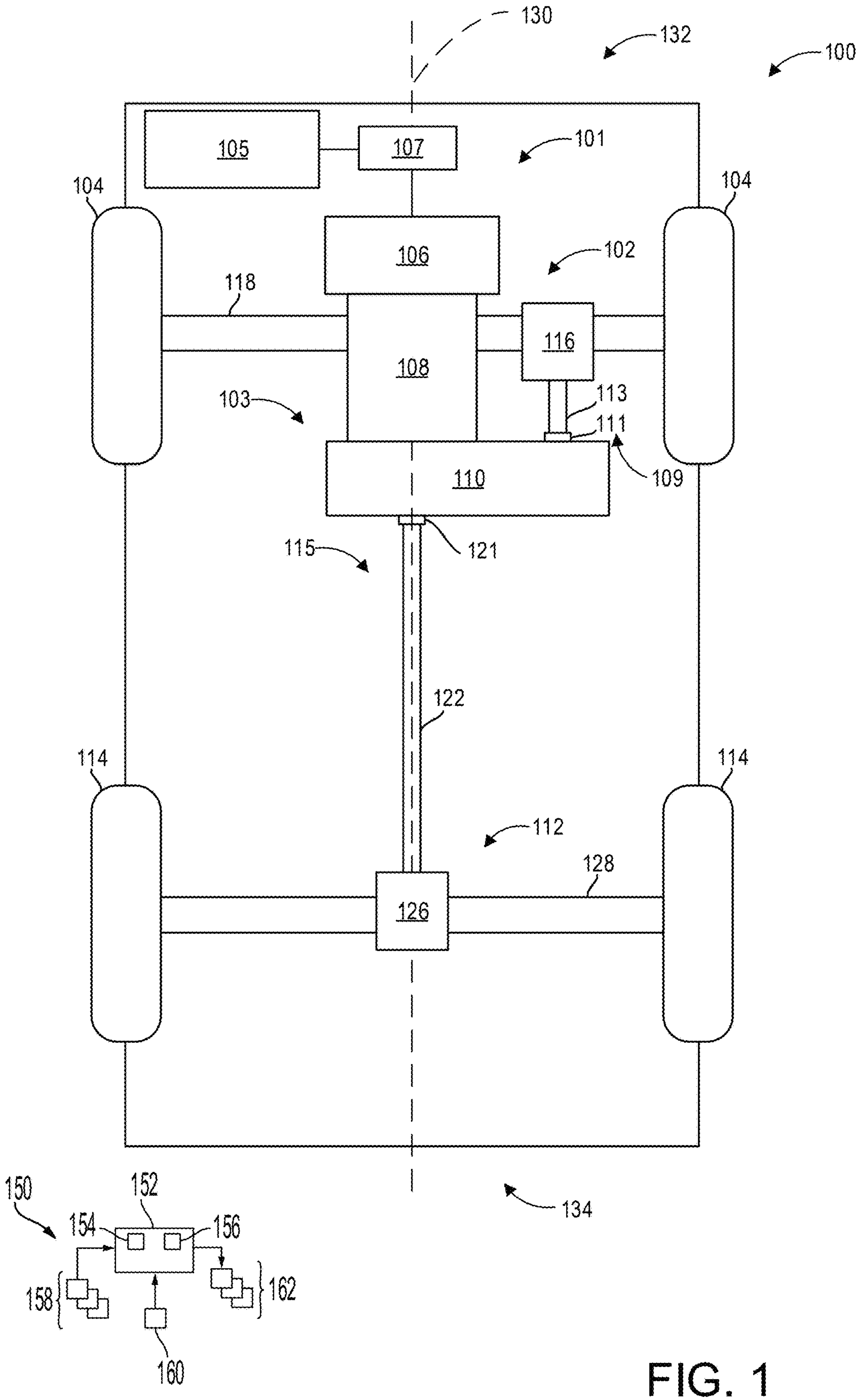
FIG. 1 shows a vehicle with one or more drive axle systems of the present disclosure.

A plurality of examples of differential assemblies and differentials therewithin are described herein, that are configured with a locking interface between an input ring gear, more specifically a crown, and a housing. The housing is a differential housing, and is referred to herein as such, where the differential housing houses and supports a plurality differential gears including differential bevel gears, such as spider gears, and side gears. The side gears may rigidly couple or connect to axle shafts that drivingly couple to drive wheels of the axle, where when the side gears are driven to rotate via torque or other forms of rotational energy, the drive wheels are driven to rotate via the rotational energy. The differential housing may be a differential case. As referred to herein, drivingly couple, drivingly coupled, or drivingly coupling may refer to a first component coupling one or more other components, such that rotation of the first component may drive the rotation of the other components or vice versa.

The differential housing comprises at least a first portion and a second portion, where the second portion extends from a shoulder of the first portion. More specifically, the second portion extends axially along a central and rotational axis the first portion and the second portion may be centered radially around. The crown gear includes a first set of features for the locking interface (e.g., a plurality of first locking features) and the second portion includes a second set of features for the locking interface (e.g., a plurality of second locking features). The crown gear may be arranged around the second portion of the differential housing, and rigidly coupled thereto via the locking of the first and second locking features.

For a first example, the locking interface is a splined interface, where the crown gear includes a plurality of first splines and the differential housing includes a plurality of second splines that may be mated. More specifically, the first splines extend radially inward (e.g., radially below and radially toward the central axis) from the crown gear. Likewise, the second portion includes, connects to, or rigidly couples to the second splines, the second splines extending radially outward therefrom. The crown gear may include a through hole, via which the second portion may be extended through and that the first splines and the second splines may be mated via.

For a second example, the locking interface is a protrusion-slotted interface, where the crown gear includes a plurality of slots and surfaces therearound as the first fastening features and the second portion includes a plurality of protrusions as the second fastening features. The protrusions are positioned radially around a central axis of the second portion and may be positioned radially around a sleeve of the second portion. Further, the protrusions may extend in an axial direction with respect to the central axis. The slots may have openings arranged around a through hole of the crown gear. The protrusions may extend into the slots, and the protrusions may abut and lock with the surfaces of the crown gear around the slots.

For a third example, the locking interface is a protrusion-slotted interface, where the crown gear includes a plurality of protrusions as the first fastening features and the second portion includes a plurality of slots and surfaces therearound as the second fastening features. The protrusions are positioned radially around a central axis and extend radially inward (e.g., radially below or toward the central axis) from the crown gear. The protrusions may extend into the slots, and the protrusions may abut and lock with the surfaces of the second portion around the slots. The surfaces of the second portion around the slots may be part of shoulders. Further, each of the protrusions of the third example, may include a groove or another volume extending between opposite sides of the protrusions, allowing fluid to flow through the protrusion.

For all these examples, the differential housing may include a sleeve that extends through the through hole of the crown gear. Likewise, for all these examples, the differential assembly may include a plurality of fasteners, such as screws or bolts, that may fasten the crown gear to the first portion of the differential housing. When fastened thereto, the fasteners may prevent axially movement with respect to the central axis of the crown gear away from the differential housing.

Figure 2:
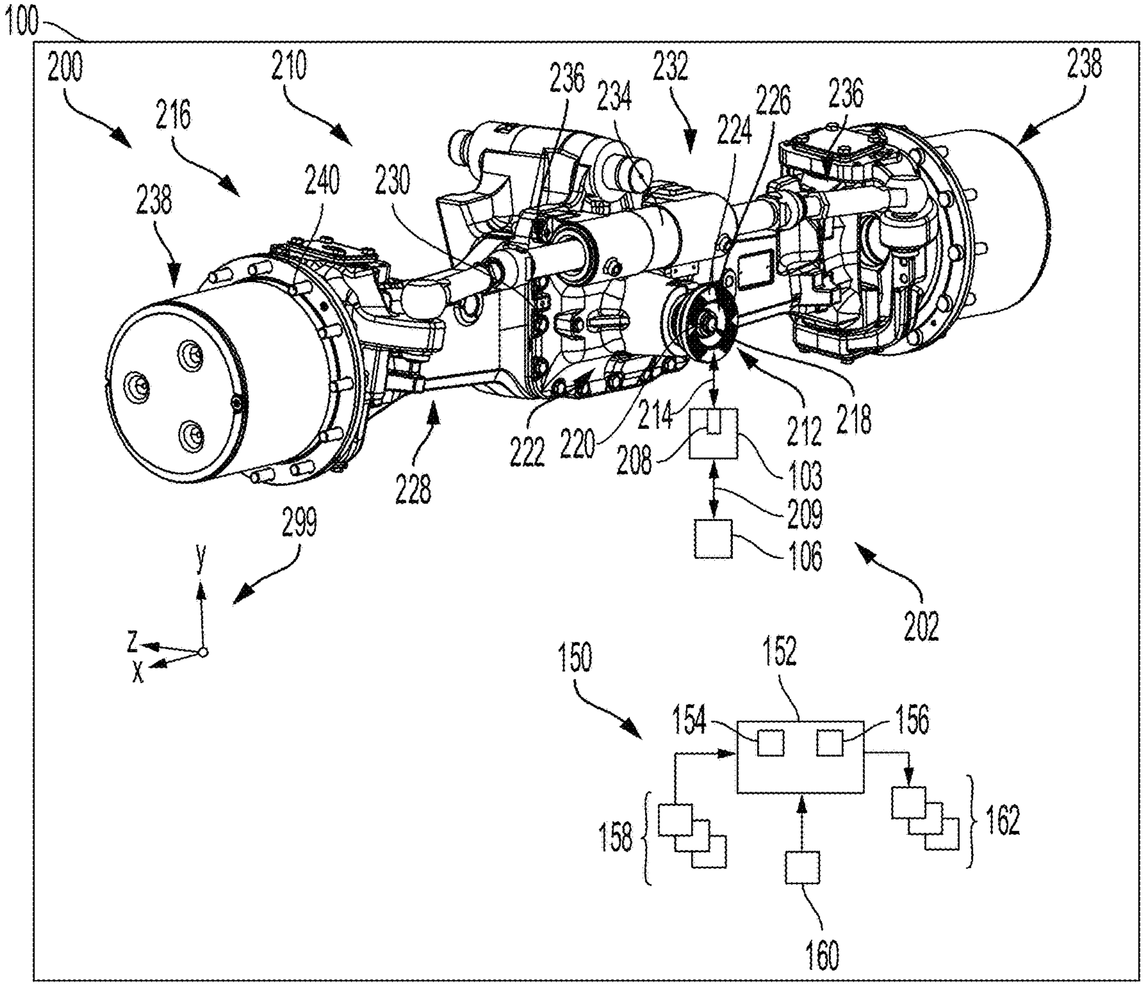
FIG. 2 shows a perspective view of a drive axle system including a differential of the present disclosure.
Figure 3:
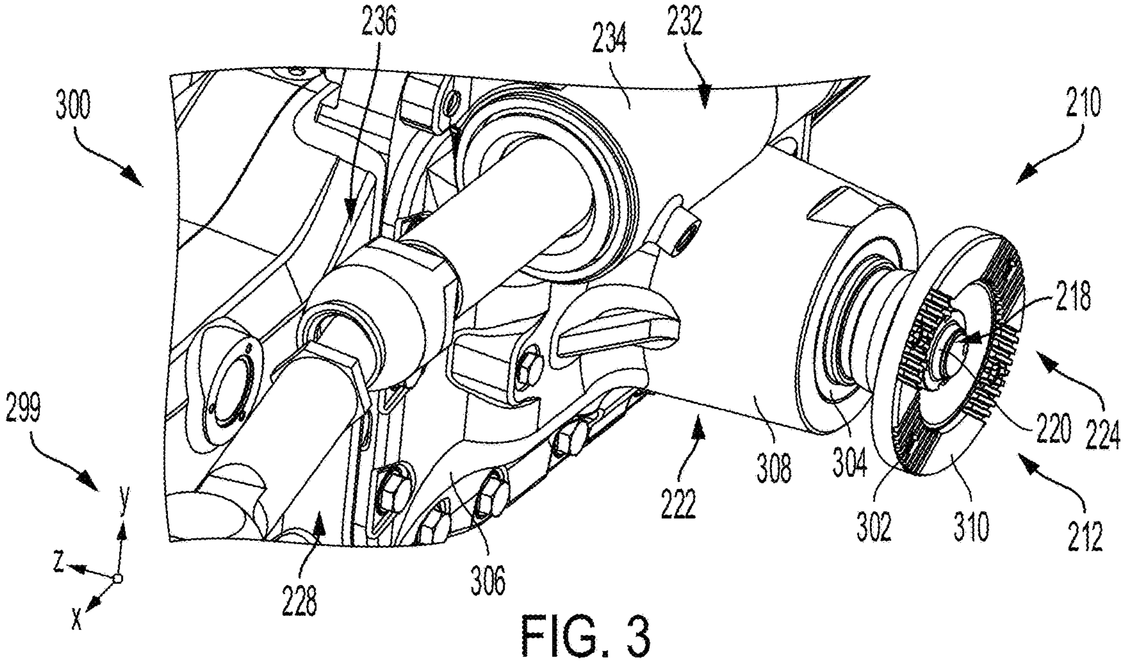
FIG. 3 shows a different detailed perspective views of the drive axle system, depicted in FIG. 2.
Figure 4:
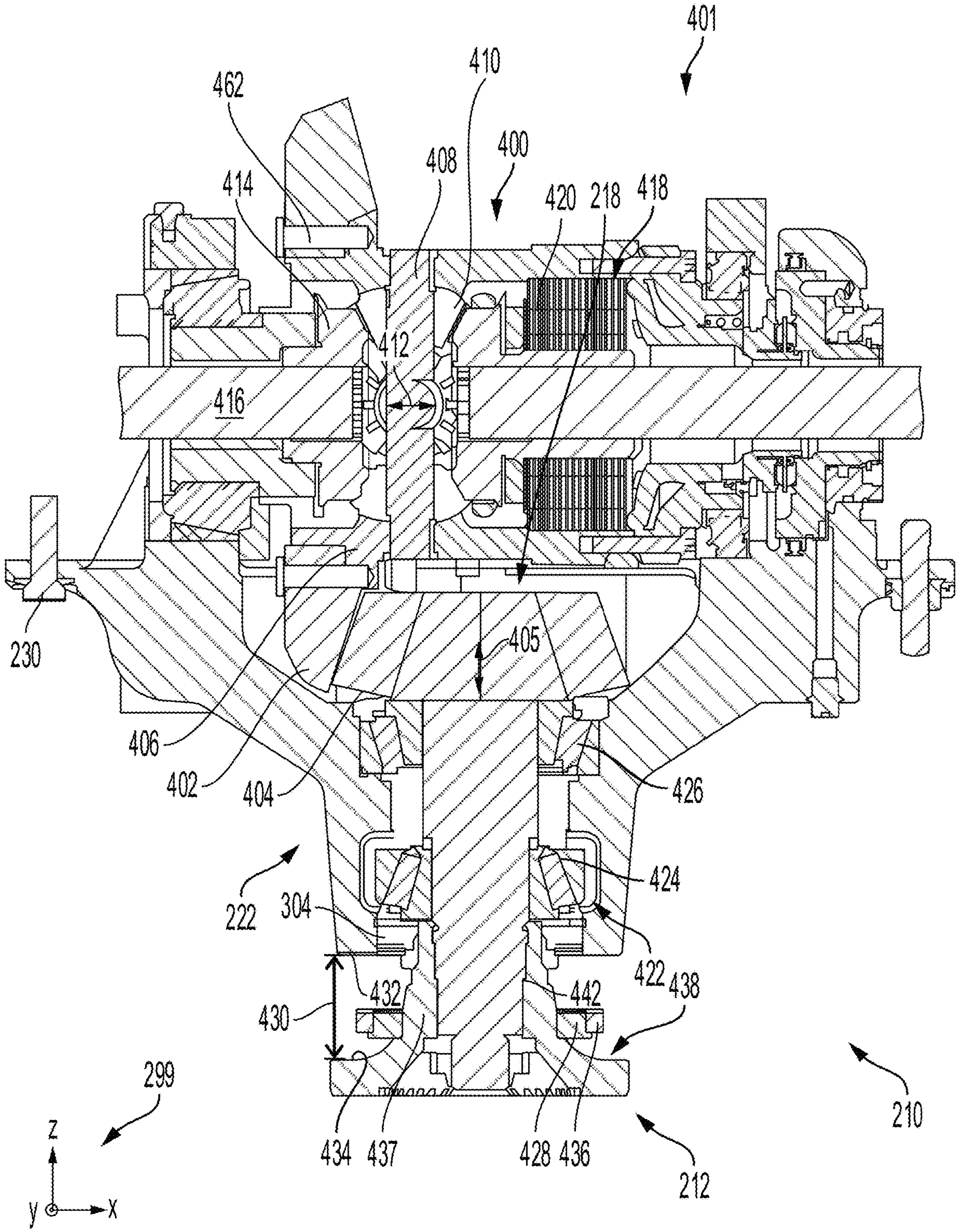
FIG. 4 shows a sectional view of the drive axle system, depicted in FIG. 2, and differential assembly housed thereby.

FIG. 1 shows a vehicle with one or more drive axle systems of the present disclosure. The vehicle may include a front and a rear drive axle including a differential of the present disclosure. FIG. 2 shows a perspective view of a drive axle system including an example of a differential of the present disclosure. FIG. 3 shows a different detailed perspective views of the drive axle system, depicted in FIG. 2, including features of a housing, such as a differential carrier, around the differential. FIG. 4 shows a sectional view of the drive axle system, depicted in FIG. 2, and differential assembly housed thereby.

Figure 5:
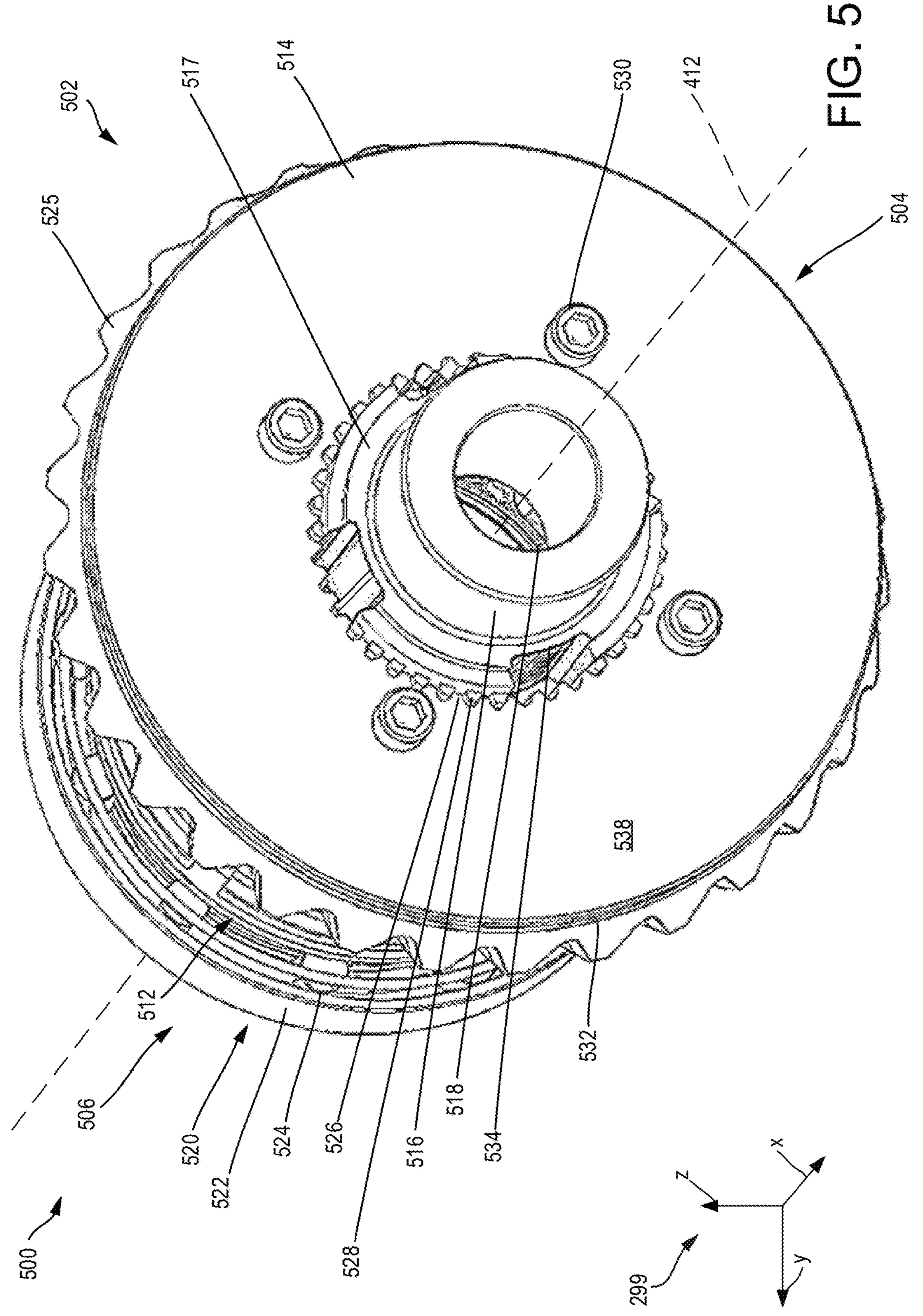
FIG. 5 shows a perspective view of a first example of a differential.
Figure 6:
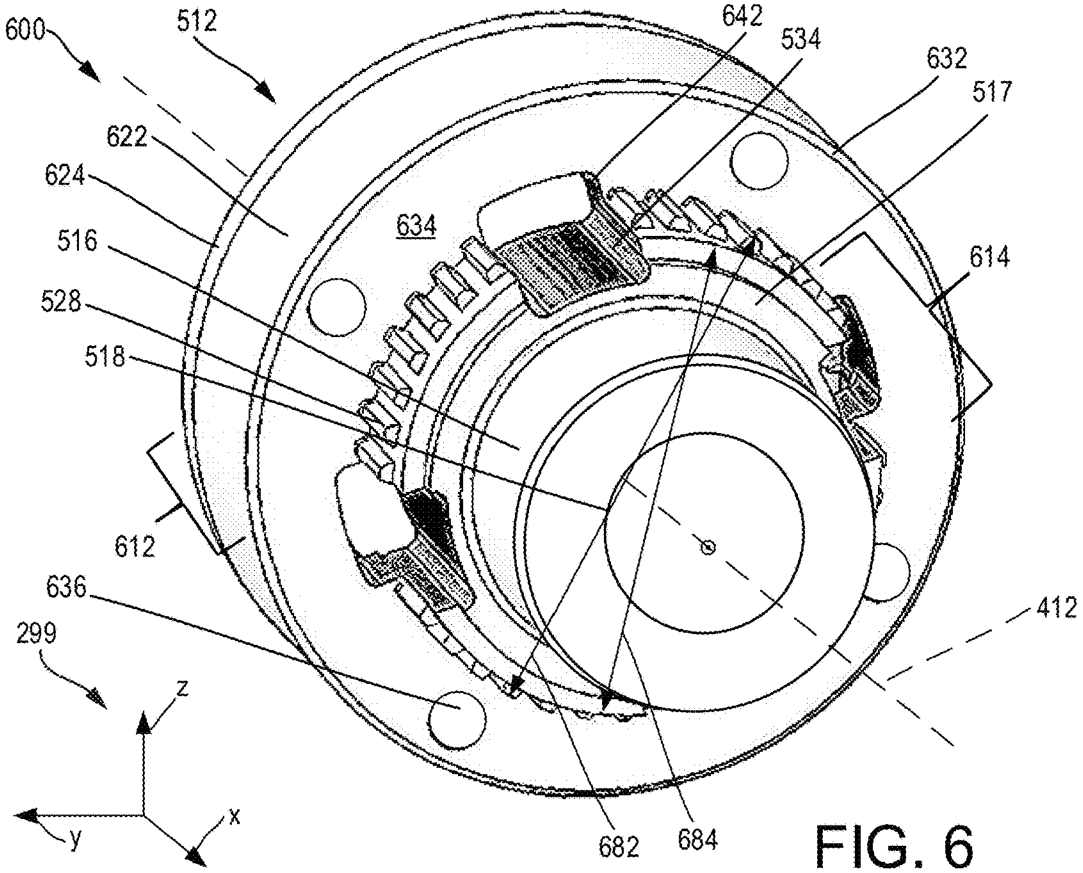
FIG. 6 shows a perspective view of a differential housing of the first example of the differential, depicted in FIG. 5.
Figure 7:
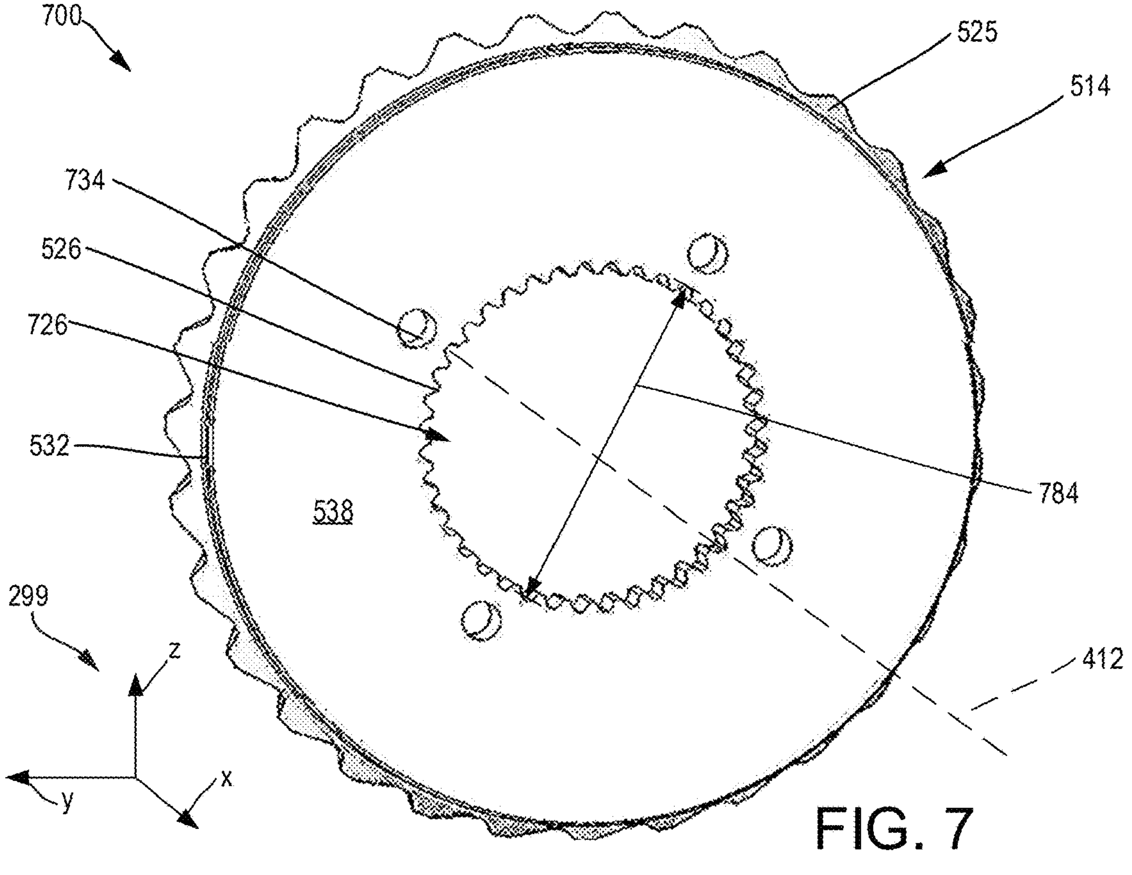
FIG. 7 shows a perspective view of a crown of the first example of the differential, depicted in FIG. 5.

FIG. 5 shows a perspective view of a first example of a differential, where the first example of the differential has a differential housing and a crown gear rigidly coupled via a splined interface. FIG. 6 shows a perspective view of the differential housing of the first example of the differential, depicted in FIG. 5. FIG. 7 shows a perspective view of a crown of the first example of the differential, depicted in FIG. 5.

Figure 8:
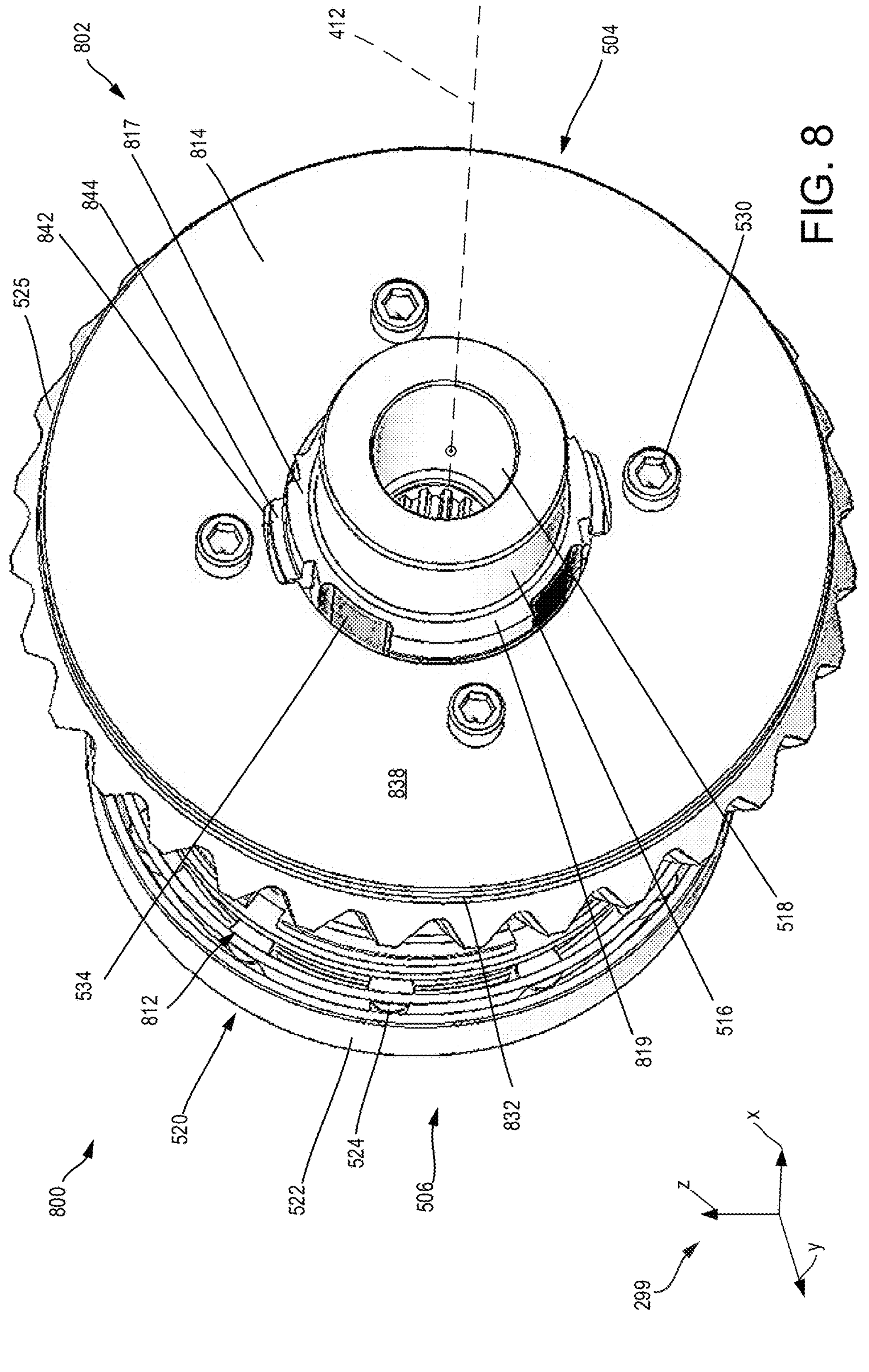
FIG. 8 shows a second example of a differential.
Figure 9:
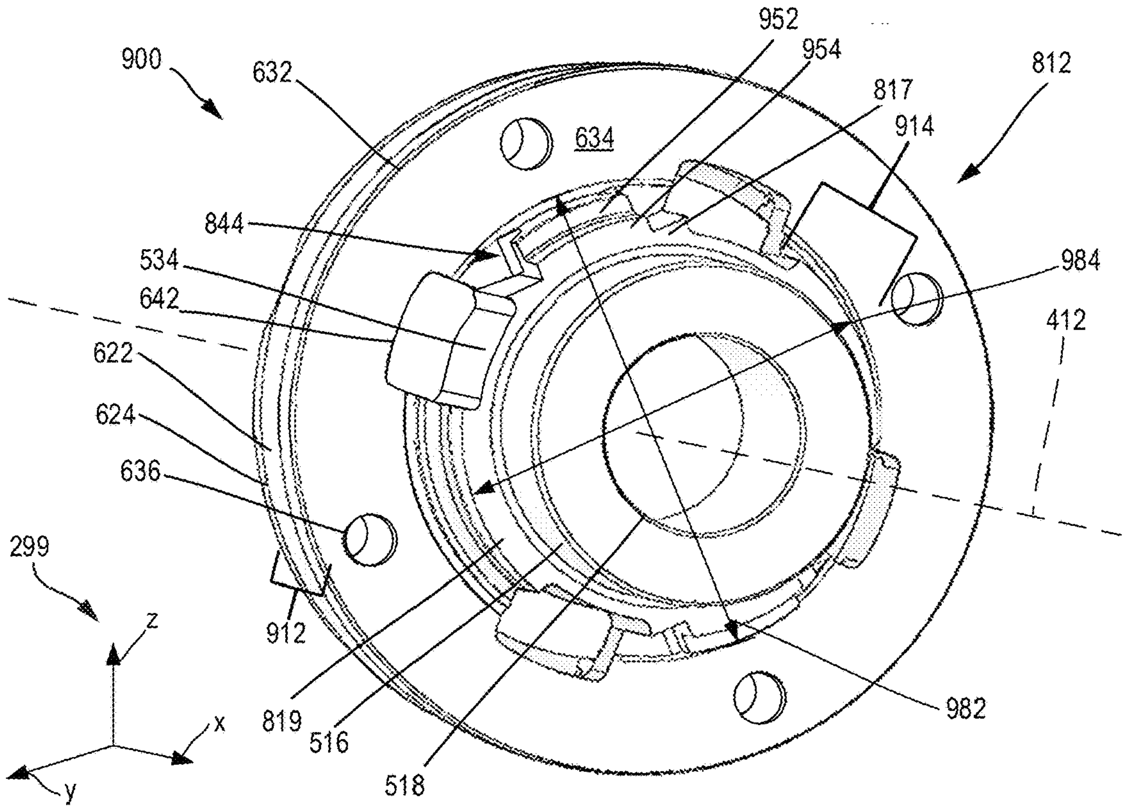
FIG. 9 shows a perspective view of a differential housing of the second example of the differential, depicted in FIG. 8.
Figure 10:
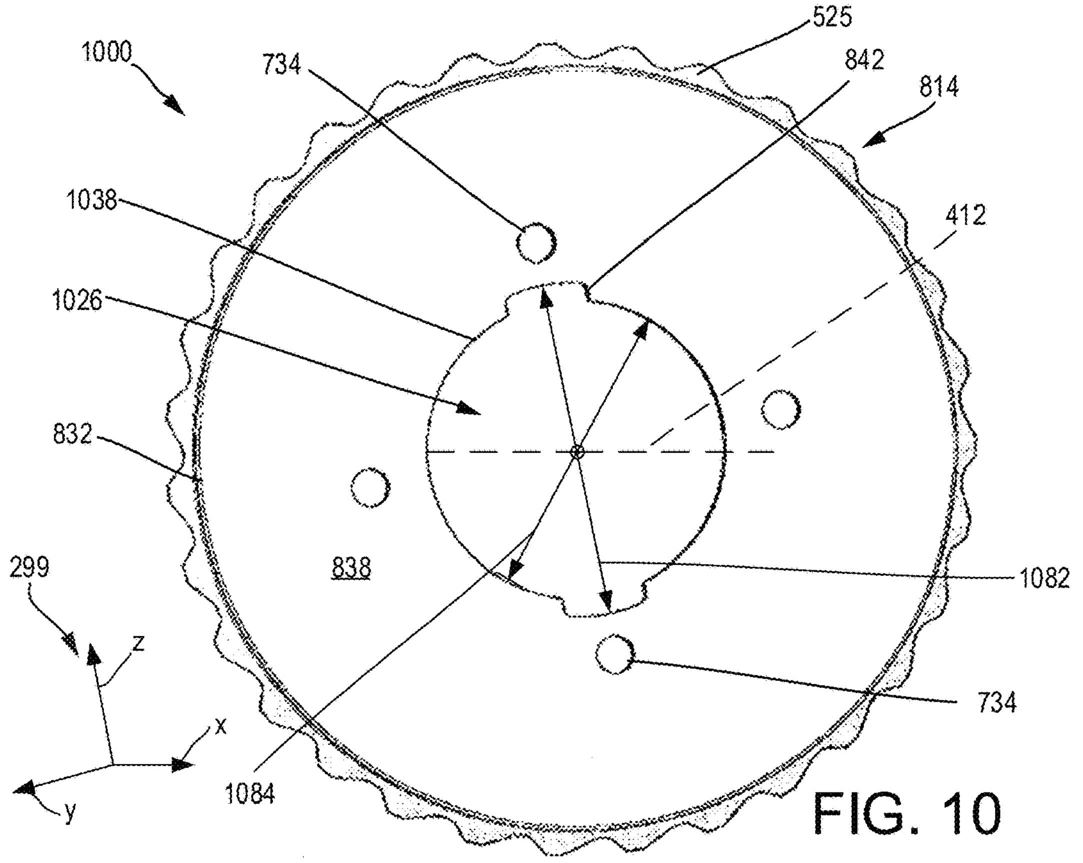
FIG. 10 shows a perspective view of a crown of the second example of the differential, depicted in FIG. 8.

FIG. 8 shows a second example of a differential, where the second example of the differential has a differential housing and a crown rigidly coupled via a protrusion-slot interface. FIG. 9 shows a perspective view of a differential housing of the second example of the differential, depicted in FIG. 8. FIG. 10 shows a perspective view of a crown of the second example of the differential, depicted in FIG. 8. The differential housing of FIGS. 8-9 includes or rigidly couples to the protrusions. The crown gear of FIGS. 8 and 10 includes the slots.

Figure 11:
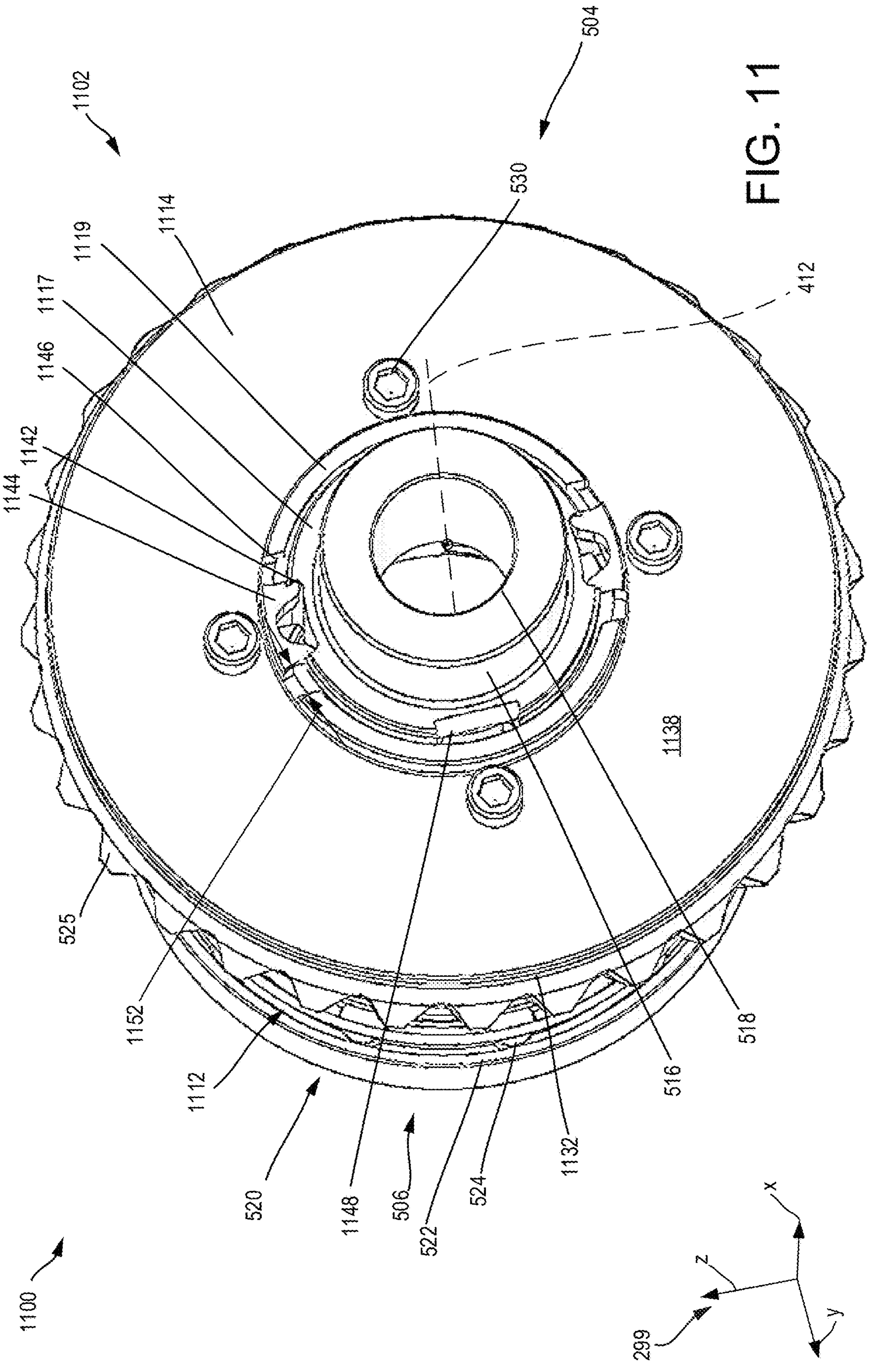
FIG. 11 shows a perspective view of a third example of a differential.
Figure 12:
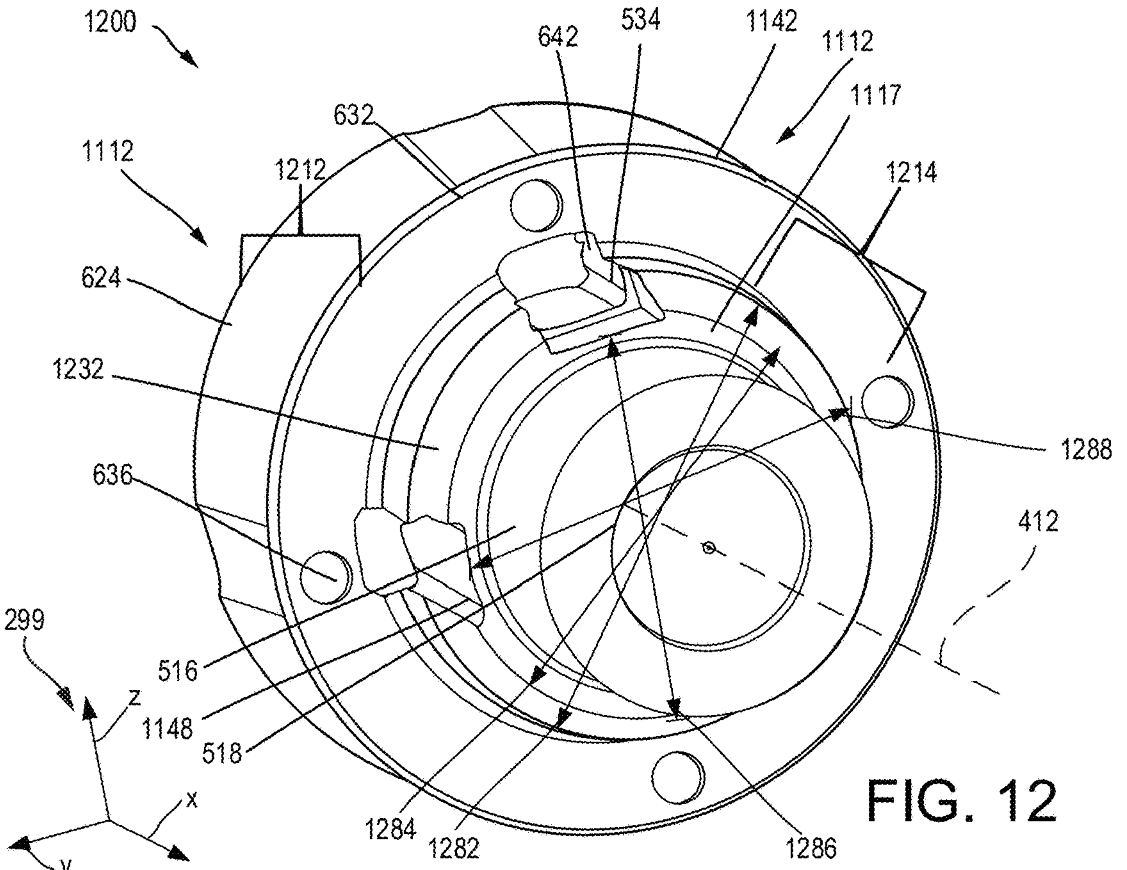
FIG. 12 shows a perspective view of a differential housing of the third example of the differential, depicted in FIG. 11.
Figure 13:
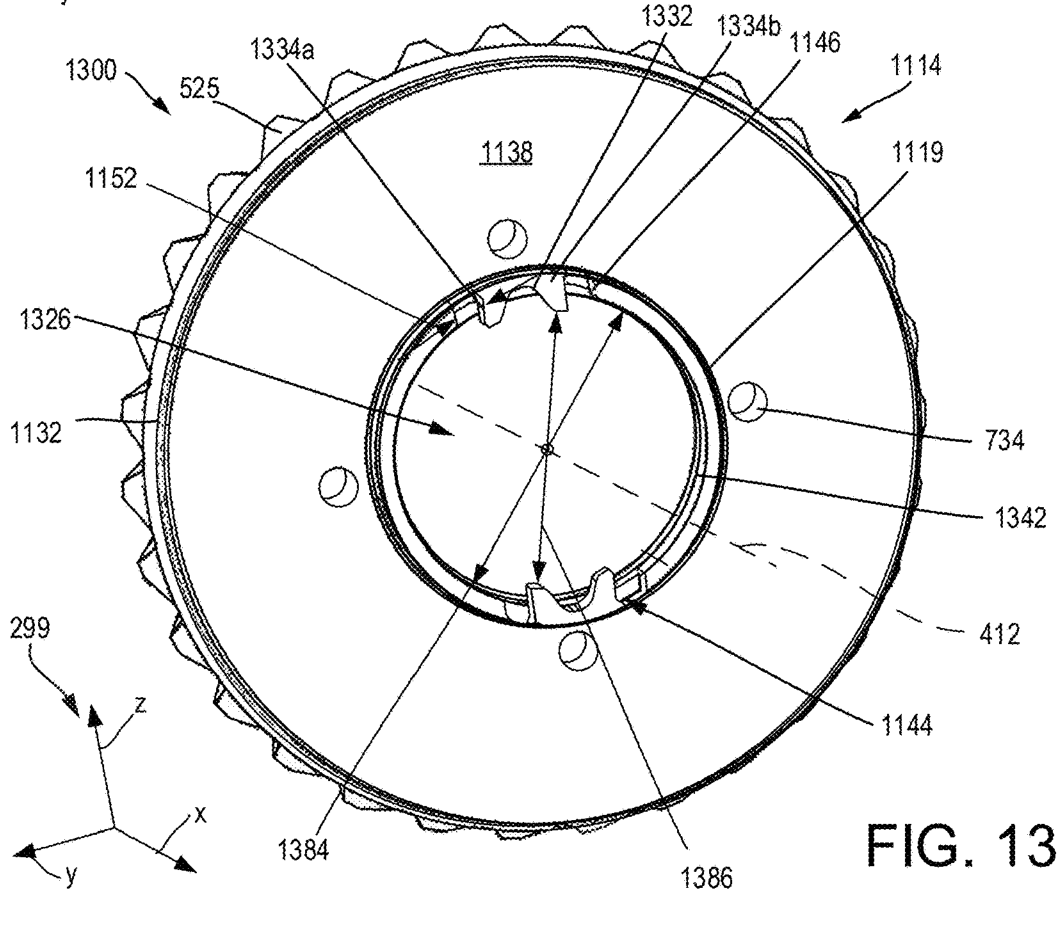
FIG. 13 shows a perspective view of a crown of the third example of the differential, depicted in FIG. 11.

FIG. 11 shows a perspective view of a third example of a differential, where the third example of the differential has a differential housing and a crown rigidly coupled via a protrusion-slot interface. FIG. 12 shows a perspective view of a differential housing of the third example of the differential, depicted in FIG. 11. FIG. 13 shows a perspective view of the crown gear of the third example of the differential, depicted in FIG. 11. The differential housing of FIGS. 11-12 includes the slots. The crown gear of FIGS. 11 and 13 includes or rigidly couples to the protrusions.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and/or sport utility vehicle. Additionally or alternatively, the vehicle 100 and/or one or more of its components may be in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive, a front-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

The vehicle 100 may include a first driveline 109 and/or a second driveline 115. The first driveline 109 may drivingly couple the transmission 108 and therefor the prime mover 106 to the first axle assembly 102, such that the first axle assembly 102 and first wheels 104 are a drive axle assembly and driven wheels, respectively, driven via rotational energy from the prime mover 106 via the first driveline 109. The second driveline 115 may drivingly couple the transmission 108 and therefor the prime mover 106 to the second axle assembly 112, such that the second axle assembly 112 and the second wheels 114 are a drive axle assembly and driven wheels, respectively, driven via rotational energy from the prime mover 106 via the second driveline 115. In some four-wheel drive configurations, such as shown in FIG. 1, the drivetrain 103 includes a transfer case 110 configured to receive rotary power output by the transmission 108.

For an example, of the first driveline 109, a first driveshaft 113 may drivingly couple to a first output 111 of the transfer case 110. The first driveshaft 113 (e.g., a front driveshaft) transmits rotary power from the transfer case 110 to a first differential 116 of the first axle assembly 102 to drive the first set of wheels 104. Additionally or alternatively, for an example of the second driveline 115 a second driveshaft 122 may drivingly couple to a second output 121 of the transfer case 110. The second driveshaft 122 (e.g., a rear driveshaft) transmits the rotary power from the transfer case 110 to a second differential 126 of the second axle assembly 112 to drive the second set of wheels 114. For either or both examples, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and the second driveshaft 122 may be positioned to extend in parallel with the longitudinal axis 130. For an example of a configuration of vehicle 100, the second driveshaft 122 may be centered about the longitudinal axis 130.

For an example, the first differential 116 may supply a forward wheel drive (FWD) in some capacity to vehicle 100, as part of rotary power transferred via the first driveshaft 113. Likewise, for this or another example, the second differential 126 may supply a RWD to vehicle 100, as part of the rotary power transferred via the second driveshaft 122. The first differential 116 and the second differential 126 may supply a FWD and RWD, respectively, as part of an all-wheel drive (AWD) and/or a four-wheel drive mode for vehicle 100.

The vehicle 100 may further include a control system 150 with a controller 152. Adjustment of the drivetrain 103 between the various modes as well as control of operations within each mode may be executed based on commands from the vehicle control system 150, including the controller 152. Controller 152 may be a microcomputer, including elements such as such as a processor 154 (e.g., a microprocessor unit), input/output ports, an electronic storage medium 156 for executable programs and calibration values, e.g., a read-only memory chip, random access memory, keep alive memory, a data bus, and the like. The storage medium 156 may be programmed with computer readable data representing instructions executable by a processor for performing the methods described below as well as other variants that are anticipated but not specifically listed.

Therefore, the electronic storage medium 156 may hold instructions stored therein that when executed by the processor 154 cause the controller 152 to perform the various method steps described herein. In one example, controller 152 may be a powertrain control module (PCM).

Controller 152 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, speed sensors at the first and second set of wheels 104,114, etc. Vehicle acceleration is directly proportional to accelerator pedal position, for example, degree of depression. Upon receiving the signals from the various sensors 158 of FIG. 1, controller 152 processes the received signals, and employs various actuators 162 of vehicle 100 to adjust drivetrain operations based on the received signals and instructions stored on the memory of controller 152. An input device 160 (e.g., accelerator pedal, brake pedal, gear selector, an engine and/or electric machine ignition, combinations thereof, and the like) may further provide input signals indicative of an operator's intent for vehicle control. For example, controller 152 may receive an indication of depression of the brake pedal, signaling a desire for decreased vehicle speed. In response, the controller 152 may command operations, such as breaking. Further for this or another example, the controller 152 may receive an indication of a gear shift. In response, the controller may command operations, such a shifting gear modes of the transmission 108. Alternatively, the gear modes of the transmission 108 may be shifted manually, such as if the transmission 108 is a manual transmission.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. Herein, the transmission 108 may be interchangeably referred to as a gearbox.

An axis system 299 (e.g., a plurality of reference axes of a Cartesian coordinate system) is provided FIGS. 2-13, for reference. The y-axis may be a vertical axis (e.g., parallel to a gravitational axis), the x-axis may be a lateral axis (e.g., horizontal axis), and the z-axis may be a longitudinal axis, in one example. However, in other examples, the axes of the axis system 299 may have other orientations.

FIG. 2 shows a vehicle 100 with a powertrain 202 including a drive axle system 210 show via a first view 200. The powertrain 202 includes the prime mover 106 that is rotationally coupled to the drivetrain 103 with a driveline 208, as denoted via arrows 209. The first view 200 is a side view and a perspective view of the drive axle system 210. The drive axle system 210 may be shown approximately scale. Other components of the powertrain 202 and the vehicle 100 separate from the drive axle system 210 are show schematically.

The powertrain 202 may be or may be a part of the powertrain 101 of FIG. 1. Said in another way, the prime mover 106 drivingly couples the drivetrain 103 and the driveline 208. The drivetrain 103 and more specifically the driveline 208 is rotationally connected to a drive axle system 210 and specifically a pinion input flange 212 as denoted by arrows 214. Said in another way, the drivetrain 103 and driveline 208 drivingly couple to and drivingly couple the prime mover 106 to the drive axle system 210. The mechanical connection between the driveline 208 and the drive axle system 210 is elaborated upon herein. The drivetrain 103 may include a transmission (e.g., a multi-speed transmission).

The arrows 209 may represent at least a rotational element or a plurality of rotational elements, such as a drive shaft or a plurality of drive shafts, that drivingly couples the prime mover 106 to the drivetrain 103 and, more specifically, the transmission 108. For example, the arrows 209 may include an output shaft of the prime mover 106.

The arrows 214 may represent at least a rotational element, such as another drive shaft or a plurality of other drive shafts, that drivingly couples the transmission 108 and drivetrain 103 to the drive axle system 210 and, more specifically, the flange 212. For example, the arrows 214 may include the first driveshaft 113 of FIG. 1 as a rotational element. For another example, the arrows 214 may include the second driveshaft 122 of FIG. 1 as a rotational element.

The drive axle system 210 includes a drive axle assembly 216. The first axle assembly 102 and/or the second axle assembly 112 of FIG. 1 may be or be configured as the drive axle assembly 216. Further, the drive axle system 210 includes the pinion input flange 212 which is directly coupled to a pinion gear 218. The pinion gear 218 may be an angled pinion gear. To elaborate, in the illustrated example, the pinion input flange 212 is directly coupled to a shaft 220 of the pinion gear 218 at a location external to a first differential housing 222. The shaft 220 may be referred to additionally or alternatively as the pinion gear shaft 220. The first differential housing 222 is a housing positioned around a differential assembly and differential thereof. The differential housing 222 may house and or be a part of the first differential 116 and/or the second differential 126 of FIG. 1 and the components therein.

The pinion input flange 212 includes an outboard face 224 that is profiled to attach to a suitable component in the driveline 208 such as a shaft, a joint, and the like. To elaborate, the outboard face 224 of the flange includes planar sections in the illustrated example. However, the outboard face 224 may have alternate contours, in other examples. The outboard face 224 may include attachment device openings and/or other suitable structural features that allow the pinion input flange 212 to be attached to upstream components, discussed in greater detail herein with regard to FIG. 2. Further in the illustrated example, the pinion gear shaft 220 includes a section that is positioned within an opening 226 of a section of the pinion input flange 212. However, other pinion gear constructions have been contemplated.

The differential housing 222 may be removably coupled to an axle shaft housing 228. Attachment devices 230 (e.g., fasteners such as bolts or other suitable devices) may be used to removably attach the first differential housing 222 and the axle shaft housing 228. A differential may be enclosed within the enclosure formed between the differential housing 222 and the axle shaft housing 228. Further, the differential housing 222 encloses a toothed section of the pinion gear 218, which is discussed in greater detail herein with regard to FIG. 3. The differential housing 222 therefore may serve as an access panel for internal components in the axle such as the pinion gear 218, a differential discussed in greater detail herein, and the like. The differential is configured to transmit mechanical power to axle shafts and provide speed differentiation between the axle shafts during certain operating conditions.

The drive axle system 210 may further include a steering assembly 232, in the illustrated example. Thus, the drive axle system 210 may be a drive steer axle, in one example. However, in other examples, the drive axle may be a non-steering axle. The steering assembly 232 may include a steering cylinder 234 and steering linkage 236 which mechanically attaches the steering cylinder 234 to hub assemblies 238 to allow the pivot angle of wheels connected to the hubs to be altered based on operator input, for example. The steering linkage 236 may include shafts, joints, and the like to achieve the pivot angle adjustment functionality. Wheels may be coupled to the hub assemblies 238 via attachment devices 240.

Turning to FIG. 3, it shows a second view 300 of a portion of the drive axle system 210 including an interface between the pinion input flange 212 and the shaft 220 of the pinion gear 218 in the drive axle system 210. The second view 300 is a view of the side view and a perspective view showing the flange 212, shaft 220, and a portion of the differential housing 222. The view 300 also shows the outboard face 224 includes planar sections 310 and toothed sections 302 in the illustrated example of the input flange 212. Additionally or alternatively, the input flange 212 may include openings, splines, and the like which facilitate attachment to the driveline. However, other suitable outboard face profiles may be used, in other examples. A rotary shaft seal 304 may be positioned between the shaft 220 of the pinion gear 218 and the differential housing 222. Further, the differential housing 222 may include a base 306 which attaches to the axle shaft housing 228 and an extension 308 which extends away from the base and is contoured to enclose the pinion gear 218 and a ring gear in a differential, in some instances. The extension may be pinion gear cover for the pinion gear 218, such as a pinion nose. The steering assembly 232 with the steering cylinder 234 and the steering linkage 236 is again shown in FIG. 2.

FIG. 4 shows a third view 401 that is cross-sectional view of the drive axle system 210. A differential assembly 400 is depicted via the third view 401 and housed via the housing of the drive axle system 210. More specifically, the differential assembly 400 is housed via the first differential housing 222. The differential 400 includes a ring gear 402 that meshes with a toothed section 404 of the angled pinion gear 218. The toothed section 404 may be angled with regard to a first rotational axis 405 of the pinion gear 218. The pinion gear may be centered and may spin around the first rotational axis 405. The first rotational axis 405 may be parallel with z-axis and therein be a longitudinal axis relative to a vehicle that may house the drive axle system 210.

The ring gear 402 is coupled to a housing 406 which rotates a pinion gear shaft 408 with pinion gears 410 (e.g., differential pinion gears) that are rotationally coupled thereto and rotate about an axis 412. The axis 412 may be another rotational axis and a central axis for the ring gear 402 and the second differential housing 406 to be centered there around. The housing 406 may be a second housing for the differential 400 and may be referred to alternatively or additional herein as the second differential housing 406. The second differential housing 406 a center housing of the differential 400, and more specifically, the second differential housing 406 may be a differential case. The pinion gears 410 may be spider gears for an example. The axis 412 may be parallel with x-axis of the axis system 299 and therein be a lateral axis relative to the vehicle that may house the drive axle system 210.

The second differential housing 406 may include a plurality of first mateable features and the ring gear 402 may include a plurality of second mateable features. When the first mateable features are mated with the second mateable features, the ring gear 402 may mate with and rigidly couple to the second differential housing. The first mateable features and the second mateable features may mate allowing the ring gear 402 to rigidly couple the second differential housing 406 absent of fastening via fasteners or a fastening system or joining via a weld or via an adhesive. The mateable feature may increase a threshold of desired of torque and other rotary power transferable from the ring gear 402 to the second differential housing 406 compared to only using fasteners before degradation occurs. Further, the mateable features may reduce degradation to the ring gear 402, the second differential housing 406, and other features and components of the differential assembly 400 compared to only using fasteners to rigidly couple the ring gear 402 and the second differential housing 406.

The mateable features include at least a plurality of protrusions and a plurality of other features that form a plurality of spaces between the other features. When the ring gear 402 and the second differential housing 406 are mated, the protrusions may extend into the spaces and both contact and lock against surfaces of the other features, such that the ring gear 402 and the second differential housing 406 are rigidly coupled. The ring gear 402 may be removable and decouplable from the second differential housing 406 via translation along a common central axis therebetween, such as the axis 412.

It is to be appreciated, that in addition to the first mateable features and the second mateable features, the differential assembly 400 may include fasteners, such as a plurality of fasteners 462, to couple and further secure the ring gear 402 to the second differential housing 406. The fasteners 462 may extend through the features of the ring gear 402 and the second differential housing 406. The fasteners 462 may fix the ring gear 402 to the second differential housing 406 such as to reduce movement of the ring gear 402 away from the second differential housing 406 in a direction parallel with the central axis and rotation axis. Said in another way, the fasteners 462 may reduce translation of the ring gear 402 away from the second differential housing 406 when coupled thereby. Torque and rotational energy may be reduced from transferring from the ring gear 402 to the second differential housing 406 and vice versa via fasteners 462 below a first threshold. Below the first threshold, the force from the torque and rotational energy is less than a second threshold of force, where at or above the second threshold of force fretting, bending, and/or other forms of degradation may occur to the fasteners 462.

The pinion gears 410 may mesh with a plurality of side gears 414. The side gears 414 may rigidly couple the axle shafts 416. More specifically, the side gears 414 may be profiled (e.g., splined) to attach and rigidly couple to axle shafts 416. This arrangement allows for speed differentiation between the side gears 414 and therefore axle shaft during certain operating conditions. In the illustrated example, the differential assembly 400 and differential therein may include a locking device 418. The locking device 418 may include a plurality of plates 420 and other components that are configured to lock co-rotation of the side gears 414 when engaged. The locking device 418 may be housed via the second differential housing 406. In this way, the differential 400 may be a locking differential which may be actively controlled to engage and disengage the locking device to increase the vehicle's tractive performance. However, another type of differential may be utilized, in other examples such as an open differential, a limited slip differential, a torque vectoring differential, and the like.

In the illustrated example, a pair of bearings 422 (which include bearings 424 and 426) is coupled to the pinion gear shaft 220 of the pinion gear 218. The bearings 424 and 426 may be thrust bearings (e.g., spherical roller thrust bearings) in the illustrated example to support axial loads from the driveline and the ring gear 402. To expound, the bearings 424 and 426 are positioned to react load exerted in opposing axial directions, in the illustrated example.

An axial displacement sensor 428 is depicted in FIG. 3. The axial displacement sensor 428 is configured to generate axial displacement data that is indicative of an axial displacement 430 between the pinion input flange 212 caused by varying degrees of torque transmitted through the flange. To elaborate, the axial displacement 430 may be the axial distance between a surface 432 of the differential housing 222 and an inboard surface 434 of the pinion input flange 212. However, other suitable surfaces or locations in the housing and the flange of a differential may be used to determine the axial displacement. The axial displacement 430 is measured along an axis which is parallel to the z-axis, in the illustrated example. However, other orientations with regard to the axial displacement measurement are possible.

An angular speed sensor 436 is further depicted, where the angular speed sensor 436 may be configured to generate angular speed data which is indicative of an angular speed of the pinion input flange 212 and therefore the pinion gear 218. The angular speed sensor 436 may either be directly coupled to the pinion input flange 212 or may be coupled to the flange via attachment to the displacement sensor, in different examples. Similarly, the axial displacement sensor 428 may be directly coupled to the pinion input flange 212 or may be coupled to the angular speed sensor 436 which is directly coupled to the pinion input flange 212. To elaborate, in the illustrated example, the axial displacement sensor 428 is directly coupled to a body 437 of the pinion input flange 212 and the angular speed sensor 436 is coupled to the outer circumference of the axial displacement sensor. However, in other examples, the angular speed sensor 436 may be directly coupled to the flange body 437 and the axial displacement sensor 428 may be directly coupled to the speed sensor.

The displacement sensor 428 and the angular speed sensor 436 are located outside of the first differential housing 222. To elaborate, the displacement sensor 428 and the angular speed sensor 436 may be positioned between the outer surface 432 of the first differential housing 222 and an inboard side 438 of the pinion input flange 212. In this way, the sensors are able to be more efficiently installed subsequent to assembly of the drive axle in relation to manufacturing. Further, the sensors may be installed without machining specific mounting structures in the drive axle, if desired. In this way, installation efficiency is increased and the system's applicability is increased.

In the illustrated example, the flange body 437 includes an interior surface that is in face sharing contact with an outer circumferential surface 442 of the pinion gear shaft 220. Thus, the flange body circumferentially surrounds the pinion gear shaft. Specifically, the flange body may be press-fit to the pinion gear shaft, in one example. However, other suitable attachment techniques between the flange body and the pinion gear shaft have been contemplated such as welding or the components may be formed (e.g., machined) as a monolithic structure.

The rotary shaft seal 304 which may be optionally included in the drive axle system 210, is again depicted in FIG. 4. Further, the axle housing has been omitted in FIG. 4. However, it will be appreciated that attachment devices 230 may be used to attach the differential housing 222 to the axle housing.

Turning to FIG. 5 it shows a fourth view 500 of a first differential 502. The fourth view 500 is a side view and a perspective view of the first differential 502. The first differential 502 is first example of a differential of the present disclosure, and the first differential 502 may be or be a part of the differential assembly 400 of FIG. 4. The first differential 502 includes a first end 504 and a second end 506, where the first end 504 is on the opposite side of the differential from the second end 506. The first differential 502 includes a first differential housing 512 and a first crown gear 514, where the first crown gear 514 is rigidly coupled to the first differential housing 512 via a splined interface therebetween.

The first differential housing 512 may be an example of a center differential housing, such as a differential case. More specifically the first differential housing 512 may be a first example of the second differential housing 406 of the present disclosure. The first differential housing 512 may house a plurality of gears, including a plurality of differential pinion gears, such as spider gears, and side gears of the differential. For example, the first differential housing 512 may house and support the pinion gears 410 and the side gears 414 of FIG. 4. The side gears may rigidly couple to axle shafts of a larger axle system, such as the axle shafts 416 of FIG. 4.

The first crown gear 514 may be a first example of the ring gear 402 of FIG. 4 and a first example of a crown gear of the present disclosure that is a first input gear to the differential. The first crown gear 514 is splined and couplable to the first differential housing 512 via a plurality of splines. The first crown gear 514 is a bevel gear with a frustoconical shape and more specifically a frustoconical outer surface (e.g., a cog surface or a root surface) hosting a plurality of teeth 525. For example, the first crown gear 514 may be positioned such that the outer surface decreases in diameter, with a frustoconical shape decreasing in diameter in the direction toward the first end 504.

The first differential housing 512 and the first crown gear 514 may be centered around the axis 412. More specifically, the differential housing 512 and the first crown gear 514 may be positioned radially around the axis 412. Said in another way, the axis 412 may be concentric to the differential housing 512 and the first crown gear 514.

The first differential housing 512 may include a sleeve 516 sleeve that extends outward from a plurality of first shoulders 517. The sleeve 516 may extend axially from the first shoulders 517 with respect to the axis 412, and the sleeve 516 be positioned radially around the axis 412. Likewise, the first shoulders 517 may extend outward from the sleeve 516 and the axis 412, and, more specifically, radially outward from the sleeve 516. Said in another way, the first shoulders 517 extend radially above and away from the sleeve with respect to the axis 412. The first crown gear 514 may be positioned around, have surface sharing contact with, and rigidly couple the first shoulders 517. Said in another way, the first shoulders 517 may be part of a hub via which the first crown gear 514 may be positioned around, contact, and rigidly couple to. It is to be appreciated that instead of having the first shoulders 517, the first differential housing 512 may instead have a shoulder that is singular structure.

The sleeve 516 includes a hole 518, where the hole 518 may be concentric to the sleeve 516. The hole 518 is a through hole extending from and volumetrically connected to an end of the sleeve nearest to the first end 504 from at least a volume or space internal to the first differential housing 512. The sleeve 516 may support and be positioned around an axle shaft of an axle assembly, such as an axle shaft of the axle shafts 416. More specifically, the axle shaft may extend through and occupy the hole 518 to an internal volume or space of the first differential housing 512.

A bearing assembly 520 may be positioned around the housing the bearing assembly 520 may be closest to the second end 506 from the first end 504, and on the opposite side of the first differential 502 from the first crown gear 514. For example, the bearing assembly 520 may be positioned radially around the first differential housing 512.

The bearing assembly 520 may include an outer race 522 and an inner race. Likewise, the bearing assembly may include one or more bearings, such as bearings 524. For example, the bearings 524 may be ball bearings. However, it is to be appreciated that the bearing assembly may include one or more other types of bearings, such as a smooth bearing or a plurality of roller bearings. The bearing assembly 520 may allow the first differential housing 512 to rotate separately of another housing positioned therearound, such as the first differential housing 222 of FIG. 2 and other housing of the differential assembly 400 of FIG. 4 and the drive axle system 210 of FIG. 2.

The first crown gear 514 includes the teeth 525. The teeth 525 have a profile that extend outward and, more specifically, radially outward from the first crown gear 514. Said in another way, the teeth 525 may be positioned around and extend away from the outer circumference of the first crown gear 514 and from a surface of the crown gear 514 at the pitch diameter. Additionally, the teeth 525 may extend axially, with respect to the axis 412, toward the first differential housing 512 and toward the second end 506 from the first crown gear 514. The first crown gear 514 may be a standard bevel gear, and the teeth 525 may be straight teeth extending with and away from a frustoconical surface (e.g., the outer surface). However, it is to be appreciated that the shape of the teeth 525 of the first crown gear 514 may be of another configuration. For another example, the first crown gear 514 may be a spiral bevel gear, and therein the teeth 525 have spiral shaped teeth (e.g., spiral teeth). For another example, the first crown gear 514 may be a hypoid gear.

The first differential housing 512 and the first crown gear 514 are rigidly couplable via a splined interface (e.g., a splined locking interface). The first crown gear 514 has at least a plurality of first splines 526. The first splines 526 may be rigidly coupled to, connected to, or part of the first crown gear 514. The first splines 526 are the external splines for the splined interface. The first differential housing 512 and, more specifically, the first shoulders 517 have at least a plurality of second splines 528. The second splines 528 may be rigidly coupled to, connected to, or part of the first shoulders 517. The second splines 528 are the internal splines for the splined interface. The splined interface of the first differential 502 includes at least the first splines 526 and the second splines 528. However, it is to be appreciated that the splined interface may include other splines rigidly coupled to, connected to, or formed from the first crown gear 514 and/or the first differential housing 512.

The first splines 526 may extend radially inward from and radially below the first crown gear 514. Likewise, the second splines 528 extend radially outward and radially above the first shoulders 517. The first splines 526 and the second splines 528 may mate (e.g., be mateable) and rigidly couple the first crown gear 514 to the first shoulders 517, and thereby the first splines 526 and second splines 528 may rigidly couple the crown gear 514 to the first differential housing 512. For an example, the first splines 526 and the second splines 528 may be mated via sliding the first splines 526 between the spaces between the second splines 528.

It is to be appreciated, that the first differential 502 may include a plurality of fasteners 530 that may fasten the first crown gear 514 to the first differential housing 512. The fasteners 530 may be screws for a first example. For a second example, the fasteners 530 may be bolts. However, it is to be appreciated that the fasteners 530 may be non-limiting and may include other types of fasteners such as clamps.

The fasteners 530 may couple the first crown gear 514 to the first differential housing 512 such as to reduce movement of the crown gear 514 away from the first differential housing 512 below a threshold of distance. More specifically, when fastened via the fasteners 530, may reduce axial movement of the first crown gear 514 along the axis 412 from the first end 504 and the first differential housing 512. The fasteners 530 may extend through a wall 532 of the first crown gear 514 and a surface 538 thereof. The teeth 525 and/or the frustoconical surface may extend outward from the wall 532.

The surface 538 is normal to the axis 412. The wall 532 may be frustoconical in shape decreasing in diameter, such as closer to the first end 504. The surface 538 may be a circular and ring like in shape. The surface 538 may extend radially outward from the first splines 526 and toward the edges of the wall 532. The surface 538 may be continuous with surfaces of the first splines 526. Likewise, the surface 538 may be contiguous with other surfaces of the first splines. Features of the fasteners 530, such as heads thereof, may press against and contact the surface 538 providing compressive force thereto.

For example, the fasteners 530 may reduce sliding of the first crown gear 514 from the first differential housing 512 and sliding of the first splines 526 from the second splines 528 at or below a first threshold of distance. Further, the fasteners 530 may increase the strength and support to the splined interface in rigidly coupling the first crown gear 514 to the first differential housing 512.

When mated the first splines 526 and second splines 528 reduce twisting or other rotational movement of the first crown gear 514 separate from the rotation of first differential housing 512, such as below a threshold of torque and/or another threshold of force applied to the first crown gear 514 or the first differential housing 512. Further, the splined interface, and the first splines 526 and the second splines 528 thereof may maximize the torque transfer, by increasing the maximum torque transferable between the first crown gear 514 and the first differential housing 512 to above a desired threshold of torque. Further, a maximum threshold of torque or other rotational energy transferable between the first crown gear 514 and the first differential housing 512, may be dependent on the mechanical strength (e.g., the tensile strength, compressive strength, and sheer strength) of the first crown gear 514, the differential gears (e.g., the differential bevel gears) housed and supported via the first differential housing 512, and the features of splined interface. The maximum threshold of torque or other rotational energy applied to the first differential 502 may be independent of the mechanical strength and number of fasteners fastening the first crown gear 514 to the first differential housing 512, such as the fasteners 530.

The splined interface, and the first and second splines 526, 528 thereof, may increase the increase robustness of the first differential 502 compared to connections using only fasteners, such as the fasteners 530. The number of the fasteners 530 may be approximately reduced below a desired amount, and the power density transmittable to differential housing 512 from the first crown gear 514 and vice versa may be increased above a threshold of rotational power. As a consequence, fretting or other forms of degradation to the fasteners 530 and features of the first crown gear 514 may be reduced.

The differential housing 512 may include a plurality of first slots 534. The first slots 534 may be positioned inward from, such as radially below or radially inward from, the wall 532 and the first splines 526. The first slots 534 may be positioned between the first shoulders 517. Said in another way, each of the first slots 534 may separate a pair of the first shoulders 517. The first slots 534 may extend through the first differential housing 512. The first slots 534 may be openings for fluid, such as a coolant and/or lubricant, to flow from a first side of the first shoulders 517, through features of the first differential housing 512, and to a second side of the first shoulders 517, where the second side is opposite the first side across from and with respect to the first shoulders 517. The fluid flowed through the first slots 534 may be oil, where oil may be used as coolant and/or lubricant for components and features of the first differential 502 and other components of an axle system, such as the shafts 416 of FIG. 4. For example, oil lubricating gears and/or shafts housed and supported by the first differential housing 512, may flow out of volumes and spaces of the first differential housing 512 therethrough the first slots 534 to lubricate and cool the first crown gear 514 or other crown gears of the present disclosure (e.g., crown gears 814, 1114 of FIGS. 8-9 and FIGS. 11-12, respectively) and the teeth 525 thereof. Oil may flow and coat the first crown gear 514 or other crown gears of the present disclosure and the teeth 525 via splashing and/or pulling across the surface 538 from the first slots 534 via centripetal force of the first differential 502. Said in another way, the inner volume or inner volumes of the first differential housing 512 are in fluid communication with the crown gear 514 or another ring gear with a splines for the splined interface via the first slots 534.

Turning to FIG. 6, it shows a fifth view 600 of the first differential housing 512. The fifth view 600 is a side view and a perspective view of the first differential housing 512. Additionally, the fifth view 600 shows the first differential housing and features and component thereof separate from other components and features of the differential 502 of FIG. 5. More specifically, the fifth view 600 shows the differential housing 512 separate from the first crown gear 514 and the bearing assembly 520 of FIG. 5.

The differential housing 512 includes at least two portions: a first portion 612 and a second portion 614. The second portion 614 extends axially away from the first portion 612 along a central axis, such as the axis 412. The first portion 612 may include a body 622 of the first differential housing 512 and an end cap 624 rigidly coupled thereto. Further the body 622 includes a second shoulder 632 with a frustoconical shape hosting a surface 634, where the second shoulder 632 is on the opposite side of the body 622 from the end cap 624. The second shoulder 632 may be part of another endcap. The surface 634 may be normal to the central axis of the differential housing 512 and/or the axis 412. The second portion 614 may extend axially along the axis 412 from the surface 634. The second portion 614 may include the first shoulders 517, the sleeve 516, and the second splines 528.

When rigidly coupled to the differential housing 512, the first crown gear 514 may abut and have surface sharing contact with the second shoulder 632 and, more specifically, the surface 634.

The body 622 and the second shoulder 632 may have a plurality of second holes 636, where the second holes 636 extend through the surface 634 and into the second shoulder 632 and the body 622 in a direction normal to the surface 634. The fasteners 530 of FIG. 5 may extend through the second holes 636, such as via threading. Further, the fasteners 530 may fasten to the body 622 and the second shoulder 632 via the second holes 636. The fasteners 530 may extend through holes and the first crown gear 514 and fasten the first crown gear 514 to the second shoulder 632 and the surface 634. The fasteners 530 may press the first crown gear 514 against surface 634, and when fastened the fasteners 530 may reduce movement of the crown gear 514 a threshold of distance away from the surface 634 along the axis 412.

The first portion 612 may have a plurality of second slots 642. The second slots 642 may extend through the first differential housing 512 and other examples of differential housings of the present disclosure. More specifically, volumes of the second slots 642 may extend through the second shoulder 632 and through at least portions of the body 622. Further, volumes of the second slots 642 may extend in a direction normal to the surface 634. The second slots 642 may have volumes shaped by a plurality of surfaces of the body 622 and second shoulder 632 (e.g., body surfaces). The body surfaces may be continuous with one, more, or all of the surfaces defining the volumes of the first slots 534. Likewise, the body surfaces may be contiguous with one, more, or all of the surfaces defining the volumes of the first slots 534. The first slots 534 and the second slots 642 may be in fluid communication (e.g., fluidically coupled) such that fluid may flow from the first slots 534 to the second slots 642 and vice versa. The second slots 642 may be in fluidic communication with one or more volumes enclosed by the body 622. The second slots 642 may therein place an inner volume or a plurality of inner volumes of the body 622 in fluid communication with the first slots 534. Fluid, such as lubricant or coolant, may flow from the second slots 642 to the first slots 534 and vice versa.

The second slots 642 may be openings for fluid and, more specifically, liquid, to be flowed from a first side of second shoulder 632, through the shoulder 632, and to a second side of the second shoulder 632, where the second side is opposite the first side across and with respect to the shoulder 632. The fluid may be a coolant and/or lubricant. More specifically the fluid may be oil, where oil may be used as a coolant and/or lubricant for components and features of the first differential 502 and other components of an axle system, such as the shafts 416 of FIG. 4.

The second portion 614 may have a first diameter 682 and a second diameter 684. The first diameter 682 is an outer diameter of the second portion 614 extending across the second portion 614, through the center of the hole 518 and the second portion 614, and to the tips of the second splines 528. The second diameter 684 may be another outer diameter for the first shoulders 517, extending across at least two of the first shoulders 517, through the center of the hole 518 and the second portion 614, and to outer surfaces of the first shoulders 517 connected to the second splines 528.

Turning to FIG. 7, it shows a sixth view 700 of the first crown gear 514. The sixth view 700 is a side view and a perspective view of the first crown gear 514. Additionally, the sixth view 700 shows the first differential housing and features and component thereof separate from other components and features of the differential 502 of FIG. 5. More specifically, the sixth view 700 shows the first crown gear 514 separate from the first crown gear 514 and the bearing assembly 520 of FIG. 5.

The first crown gear 514 has a third hole 726. The third hole 726 may be centered around a central axis of the first crown gear 514, such as being centered around the axis 412. Said in another way, the third hole 726 may be concentric to the first crown gear 514. The third hole 726 is a through hole through the first crown gear 514, extending through the wall and the surface 538 thereof. The third hole 726 may be centrally located to the first crown gear 514. Said in another way the third hole 726 may be concentric to the first crown gear 514. The third hole 726 may be centered around the axis 412 and, more specifically, be positioned radially around the axis 412. The third hole 726 may be the passage of the first crown gear 514 described for FIG. 5.

The second portion 614 and, more specifically, the sleeve 516 and the first shoulders 517 be positioned in and may extend through the third hole 726. Said in another way, the first crown gear 514 may be positioned around, contact with, and lock to the second portion 614 via the third hole 726. The first splines 526 may extend radially inward (e.g., radially below) the first crown gear 514 toward the center of the third hole 726.

In addition to the third hole 726, the first crown gear 514 may have a plurality of fourth holes 734. The fasteners 530 may extend through a plurality of fourth holes 734 and through the wall 532 via the fourth holes 734. Further, the fasteners 530 may extend into and fasten to the second holes 636 of FIG. 6 via the fourth holes 734.

The third hole 726 may be a third diameter 784. The third diameter is an inner diameter of the first crown gear 514 extending from roots of crown gear between the first splines 526, through the center of the of the third hole 726, and to other roots between the first splines 526 on the opposite side of the hole. The third diameter 784 is larger than the first diameter 682 and the second diameter 684, allowing the second portion 614 to extend and slide through the third hole 726. More specifically the third diameter 784 is a size greater than a threshold of distance allowing for the second splines 528 to fit between and contact the first splines 526 via the roots of the splined interface.

The described system of FIGS. 5-7 may be used to illustrate a method for assembling a differential of the present disclosure having a splined interface (e.g., the first differential 502 of FIG. 5) for locking and rigidly coupling a ring gear (e.g., the crown gear 514 of FIGS. 5 and 7) to a differential housing (e.g., the first differential housing 512 of FIGS. 5-6).

The method of assembling a first example differential that includes a splined interface, begins with centering the ring gear and the housing for the differential around a common axis. The ring gear may be the first crown gear 514 and the housing may be the first differential housing 512 of FIGS. 5-7. The common axis may be a rotational axis, for example axis 412.

The method continues by positioning the ring gear to be arranged around a second portion of the housing, where the second portion extends axially with respect to the axis from a first portion of the housing, the first portion having first width larger than an outer diameter of the second portion, and the ring gear having an inner diameter larger than the outer diameter. The first portion and the second portion may be the first portion 612 and second portion 614, respectively, of FIG. 6. Likewise, the inner diameter may be the third diameter 784 of FIG. 7 and the outer diameter may be the first diameter 682 of FIG. 6. The positioning is such that a hole or another passage through the ring gear (e.g., the third hole 726) has an area superimposed over the first portion. The passage may have a sectional area referred to as a first area and the second portion may have an area referred to as a second area. A threshold of area of the first area overlaps with a second area of the second portion. The threshold of area may be approximately all of the second area such that the second portion fits within the passage through the ring gear. Said another way, the method includes positioning the second portion to be within the inner diameter of the passage on parallel planes.

For the examples, a plurality of differential gears, including side gears and differential pinion gears (e.g., spider gears) are pre-assembled into the differential housing such as to be supported and housed via the differential housing. For another example, the centering the differential housing and the ring gear around a common axis may be proceeded or followed by assembling the side gears and the differential pinion gears within the differential housing such as to be supported and housed thereby.

After positioning the ring gear, the method includes further positioning a plurality of first holes of the differential housing and a plurality of second holes of the ring gear to align. Aligning includes arranging each the first holes to be around a common axis with a second hole of the second holes. Additionally, aligning includes overlapping each of a plurality of third areas of the first holes with each of a plurality fourth areas of the second holes, via a second threshold of area. For a first example, the first holes may be a larger diameter than the second holes, and the second threshold of area may be approximately all of the fourth area. For a second example, the second holes may be a larger diameter than the first holes, and the second threshold of area may be approximately all of the third area. The first holes and the second holes are holes for fasteners, that the fasteners may be extended through in further phases of the method to fasten the ring gear to the differential housing. The first holes and the second holes may be the second holes 636 of FIG. 6 and the fourth holes 734 of FIG. 7, respectively.

After positioning, the method includes advancing the ring gear toward the second portion or advancing the second portion toward the ring gear along the common axis, such that the first portion extends through the passage extending through the ring gear.

The method includes mating a plurality of first mateable features of the second portion with a plurality of second mateable features of the ring gear, where the first mateable features and second mateable features include a plurality of protrusions and a plurality of spaces between features of the differential. Further the first mateable features and the protrusions are a plurality of first splines are a plurality of first splines extending radially outward from the second portion and axially along the second portion, and the spaces are between a plurality of second splines of the ring gear. The first splines may be the second splines 528 of FIGS. 5-6 of the second portion 614. The second splines may be the first splines 526 of FIGS. 5 and 7 of the first crown gear 514. The second mateable features include the second splines. For this example, mating the first features and the second features includes sliding the first splines between the second splines, therein mating the splines and rigidly coupling the ring gear to the second portion.

The method includes positioning a plurality of first slots (e.g., the first slots 534) of the second portion to be within the inner diameter, and placing an inner volume of the housing in fluidic communication with a first side of the ring gear opposite to a second side of the ring gear facing the first portion. Positioning may include advancing the second portion toward the hole to within a threshold of distance. The first slots are within the inner diameter on parallel planes. The first slots are advanced toward the hole and within the diameter. Further, a wall of the ring gear is arranged around the first slots.

The method includes stopping the translation of the differential housing or the ring gear by abutting the wall of the ring gear against a surface and a shoulder of the differential housing, such as the surface 634 and the second shoulder 632 of FIG. 6. The contact with the shoulder prevents movement of the ring gear in a first direction parallel with the central axis or movement of the differential housing separate from the ring gear in a second direction parallel with the central axis, where the first direction is opposite to the second direction. Upon contact between the shoulder and the ring gear, the method may include fixing the ring gear in place against the housing using a temporary fixture system or fastening system, such as clamps.

After abutting and fixing the ring gear against the shoulder of the housing, the method includes fastening the ring gear to the first portion of the differential housing via a plurality of fasteners. Fastening may include: extending the fasteners through the first holes of the ring gear and the second holes of the differential housing, and fastening the ring gear against the first portion via the fasteners, the first holes, and second holes. Fastening may include threading the fasteners through the first holes and/or second holes. Further, fastening may include pressing heads or other features of the fasteners against the wall of the ring gear. Fastening via the fasteners reduces movement of the differential housing from the ring gear and movement of the ring gear from the differential housing to a threshold of distance in the first direction or the second direction.

After fastening the ring gear to the differential housing via the fasteners the first the method ends.

Additionally, an alternate example of the method may include arranging the differential after assembly into a second differential housing, such as a differential carrier of a drive axle assembly. Further the method includes rigidly coupling the axle shafts of the drive axle assembly to the side gears housed and supported via the first differential housing.

After rigidly coupling the axle shafts to side gears of the differential housing, the alternate example of the method ends.

Turning to FIG. 8, it shows a seventh view 800 of a second differential 802. The seventh view 800 is a side view and a perspective view of the second differential 802. The second differential 802 is a second example of a differential of the present disclosure, and the second differential 802 may be or be a part of the differential assembly 400 of FIG. 4. The second differential 802 includes a second differential housing 812 and a second crown gear 814, where the second crown gear 814 is rigidly coupled to the second differential housing 812 via a protrusion-slotted interface, where the protrusions are rigidly coupled to, connected to, or a part of and extend from the second differential housing 812. The second differential 802 may include a plurality of features and components of the first differential 502 may be repeated and not described again for brevity.

The second differential housing 812 may be an example of a center differential housing, such as a differential case. More specifically, the second differential housing 812 may be a second example of the second differential housing 406 of the present disclosure. The second differential housing 812 may house a plurality of gears, including a plurality of differential pinion gears, such as spider gears, and side gears of the differential. For example, the second differential housing 812 may house and support the pinion gears 410 and the side gears 414 of FIG. 4. The side gears may rigidly couple to axle shafts of a larger axle system, such as the axle shafts 416 of FIG. 4.

The second crown gear 814 may be a second example of the ring gear 402 of FIG. 4. The second crown gear 814 is a first example of a crown gear of the present disclosure and may be a first input gear to a differential. The second crown gear 814 slotted and couplable to the second differential housing 812 via insertion and locking of the protrusions of the second differential housing 812 with a plurality of slots of the crown gear 814. The second crown gear 814 is a bevel gear with a frustoconical shape and more specifically a frustoconical outer surface (e.g., a cog surface or a root surface) hosting teeth, such as the teeth 525. For example, the second crown gear 814 may be positioned such that the frustoconical outer surface decreases in diameter, with a frustoconical shape decreasing in diameter in the direction toward the first end 504. The outer surface with the frustoconical shape of the second crown gear 814 may share the same dimensions and shape with the outer surface of the first crown gear 514.

With exception to the features of the locking systems, the second crown gear 814 may have the same features and/or dimensions (e.g., be symmetrical) with the first crown gear 514. Likewise, with exception to the locking features of the locking systems, the second differential housing 812 may have the same features and/or dimensions with the first differential housing 512.

The second differential housing 812 and the second crown gear 814 may be centered around the axis 412. More specifically, the second differential housing 812 and the second crown gear 814 may be positioned radially around the axis 412. Said in another way, the axis 412 may be concentric to the second differential housing 812 and the second crown gear 814.

The second differential housing 812 may include a plurality of third shoulders 817 and a plurality of fourth shoulders 819. The third shoulders 817 and the fourth shoulders 819 may be positioned to extend through and have surface sharing contact with features of the second crown gear 814. Further, the second differential housing 812 may include the sleeve 516. The sleeve 516 may extend axially from the third shoulders 817 and the fourth shoulders 819 with respect to the axis 412. Likewise, third shoulders 817 and the fourth shoulders 819 may extend outward from the sleeve 516 and the axis 412, and, more specifically, radially outward from the sleeve 516. Said in another way, the third shoulders 817 and the fourth shoulders 819 extend radially above and away from the sleeve with respect to the axis 412.

The second crown gear 814 may be positioned around, have surface sharing contact with, and rigidly couple the third shoulders 817 and the fourth shoulders 819. Said in another way, the third shoulders 817 and the fourth shoulders 819 may be part of a hub via which the second crown gear 814 may be positioned around, contact, and rigidly couple to. It is to be appreciated that instead of having a plurality of third shoulders 817 and the fourth shoulders 819, the second differential housing 812 may instead have a shoulder that is singular structure. The second crown gear 814 may include a wall 832 that a portion of the second differential housing 812 may extend through via a passage when rigidly coupled. The wall 832 may have a plurality of surfaces, including a surface 838 facing out from the first end 504.

The second crown gear 814 may be a standard bevel gear, and the teeth 525 may be straight teeth extending with and away from a conical surface (e.g., the outer surface connected to and/or extending from the wall 832 via a frustoconical surface). However, it is to be appreciated that the shape of the teeth 525 of the second crown gear 814 may be of another configuration. For another example, the second crown gear 814 may be a spiral bevel gear, and therein the teeth 525 have spiral shaped teeth (e.g., spiral teeth). For another example, the second crown gear 814 may be a hypoid gear.

The second differential housing 812 and the second crown gear 814 are rigidly couplable via a slotted-protrusion interface (e.g., a slotted-protrusion locking interface). The slotted-protrusion interface of the second differential 802 includes at least a plurality of first protrusions 844 and a plurality of third slots 842. The second crown gear 814 has at least the third slots 842. The second differential housing 812 has least the first protrusions 844. There may be at least two of the third slots 842 and two of the first protrusions 844.

The first protrusions 844 may be rigidly coupled to, connected to, or part of the second differential housing 812. The first protrusions 844 may be keys or other lands that extend radially outward (e.g., radially above) the third shoulders 817, and therein may be rigidly coupled to, connected to, or formed with the third shoulders 817. Further, the first protrusions 844 may extend axially, with respect to the axis 412, from a shoulder and/or surface of the second differential housing 812. The fourth shoulders 819 may lack protrusions connected or coupled thereto and extending radially outward or radially above therefrom. The third slots 842 of the second crown gear 814 extend radially outward from (e.g., radially above) an inner surface of the second crown gear 814. The inner surface is around a passage the third and fourth shoulders 817, 819 extend through and contact the second crown gear 814 via.

The first protrusions 844 may mate (e.g., be mateable) with the third slots 842. Said in another way, the first protrusions 844 may be locking protrusions that lock with features around a volume, such as surfaces arranged around the third slots 842. The second crown gear 814 may rigidly couple to the third shoulders 817 via the mating of the first protrusions 844 with the third slots 842, and thereby the first protrusions 844 and the third slots 842 may rigidly couple the second crown gear 814 to the second differential housing 812. For example, the first protrusions 844 may be keys that lock to the third slots 842 and rigidly couple with a wall 832 of the second crown gear 814. Locking of the protrusions 844 may be accomplished via inserting the protrusions 844 through a passage of the crown gear 814 and the third slots 842. Further, locking includes locking the protrusions 844 with the surfaces of the wall 832 around the third slots 842. Each of the first protrusions 844 may mate with a slot of the third slots 842. The first protrusions 844 and the third slots 842 may be mated via sliding the first protrusions 844 into the third slots 842.

It is to be appreciated, that the second differential 802 may include the fasteners 530 that may fasten the second crown gear 814 to the second differential housing 812. The fasteners 530 may couple the second crown gear 814 to the second differential housing 812 such as to reduce movement of the crown gear 814 away from the housing 812 below a threshold of distance. More specifically, when fastened via the fasteners 530, axial movement of the second crown gear 814 is reduced along the axis 412 from the first end 504 and the second differential housing 812. The fasteners may extend through a wall 832 of the second crown gear 814 and the surface 838 thereof.

The surface 838 may be normal to the axis 412. The wall 832 may be frustoconical in shape decreasing in diameter, such as closer to the first end 504. The wall 832 and the surface 838 may be proportional or be symmetrical with the wall 532 and the surface 538, respectively, of FIG. 5, with exception to the shape change and material removed via the third slots 842 and the passage of the second crown gear 814. The passage is a volume of the second crown gear 814 that the third shoulders 817 and the fourth shoulders 819 may extend through and may volumetrically connect to the third slots 842.

Turning to FIG. 9, it shows an eighth view 900 of the second differential housing 812. The eighth view 900 is a side view and a perspective view of the second differential housing 812. Additionally, the eighth view 900 shows the second differential housing 812 and features and component thereof separate from other components and features of the second differential 802 of FIG. 8. More specifically, the eighth view 900 shows the second differential housing 812 separate from the second crown gear 814 and the bearing assembly 520 of FIG. 8.

The second differential housing 812 includes at least two portions: a first portion 912 and a second portion 914. The second portion 914 extends axially away from the first portion 912 along a central axis, such as the axis 412. The first portion 912 may include the body 622 and the end cap 624 rigidly coupled thereto. Further the first portion 912 and the body 622 includes the second shoulder 632 with a frustoconical shape hosting the surface 634. The second portion 914 may extend axially along the axis 412 from the surface 634. The second portion 914 may include the third shoulders 817, the fourth shoulders 819, the first protrusions 844, and the sleeve 516.

When rigidly coupled to the second differential housing 812, the second crown gear 814 may abut and have surface sharing contact with the second shoulder 632 and, more specifically, the surface 634.

The fasteners 530 of FIGS. 5 and 7 may extend through the second holes 636 and through other holes of the second crown gear 814. Further, the fasteners 530 may fasten to the body 622 and the second shoulder 632 via the second holes 636. The fasteners 530 may extend through holes of the second crown gear 814, such as the fourth holes 734, and fasten the second crown gear 814 to the second shoulder 632 and the surface 634. The fasteners 530 may be passed through the second holes 636 and fastened to the second differential housing 812 via threading. The fasteners 530 may press the second crown gear 814 against surface 634, and when fastened, the fasteners 530 may reduce movement of the second crown gear 814 a threshold of distance away from the surface 634 along the axis 412.

The first protrusions 844 may be step structures including a plurality of steps. For example, each of the first protrusions may be a step structure including at least a first step 952 and a second step 954. The first step 952 may extend radially outward from the second step 954. Said in another way, the first step 952 may extend radially above the second step 954. The first step 952 may abut a surface of the wall 832 of FIG. 8 of the second crown gear 814, locking against the wall 832. More specifically, the first step 952 may abut against a surface of the wall 832 opposite the surface 838. Each of the second step 954 may be inserted into a third slot of the third slots 842. The second step 954 may abut, have surface sharing contact with, and lock against surfaces of the wall 832 defining the shape of the third slots 842.

The second portion 914 and features thereof may be a fourth diameter 982 and a fifth diameter 984. The fourth diameter 982 is an outer diameter of the second portion 914 extending across the second portion, through the center of the second portion 914, the sleeve 516, and the hole 518, and to the ends of a pair of the protrusions 844, where each protrusion of the pair is on the opposite side of the second portion 914 from the other protrusion. The fifth diameter 984 is another outer diameter for the third and fourth shoulders 817, 819, extending across the second portion, through the center of the second portion 914, the sleeve 516, and the hole 518, and to the outer surfaces of the third shoulders 817 and/or fourth shoulders 819.

Turning to FIG. 10, it shows a ninth view 1000 of the second crown gear 814. The ninth view 1000 of the second crown gear 814. The ninth view 1000 is a side view and a perspective view of the second crown gear 814. Additionally, the ninth view 1000 shows the second crown gear 814 and features and component thereof separate from other components and features of the second differential 802 of FIG. 5. More specifically, the ninth view 1000 shows the second crown gear 814 separate from the second differential housing 812 and the bearing assembly 520 of FIG. 8.

The ninth view 1000 shows the second crown gear 814 includes a fifth hole 1026. The sleeve 516, the third shoulders 817, and the fourth shoulders 819 may extend through and/or be positioned in a fifth hole 1026. Further the third shoulders 817 and the fourth shoulders 819 may have surface sharing contact with the second crown gear 814 via the fifth hole 1026. The fifth hole 1026 may be a through hole through the second crown gear 814 extending through the second wall 832 and the surface 838 thereof. The fifth hole 1026 may be centrally located to the second crown gear 814. Said in another way the fifth hole 1026 may be concentric to the second crown gear 814. The fifth hole 1026 may be centered around the axis 412 and, more specifically, be positioned radially around the axis 412. The third slots 842 may extend radially outward from the fifth hole 1026, and the third slots 842 may be volumetrically connected to the fifth hole 1026. The fifth hole 1026 may be the passage of the second crown gear 814 described for FIG. 8.

A plurality of inner surfaces 1038 may be positioned around the fifth hole 1026 and the third slots 842. The inner surfaces 1038 may define shape of the fifth hole 1026 and the third slots 842. The inner surfaces may be rounded, having rounded edges and corners around the third slots 842. The third slots 842 may have a semi-rectangular volume and shaped with soft curves defined by beveled and rounded edges of the inner surfaces 1038.

The second crown gear 814 may have a sixth diameter 1082 and a seventh diameter 1084, where the sixth diameter 1082 and the seventh diameter 1084 are inner diameters of the second crown gear 814. The sixth diameter 1082 and the seventh diameter 1084 extend from points on inner surfaces 1038 to other points opposite the points across the center of the fifth hole 1026. More specifically, the sixth diameter 1082 is an inner diameter for the third slots 842 extending through the center of the fifth hole 1026 to the tips of the inner surfaces 1038 around the third slots 842. Further, the seventh diameter 1084 is an inner diameter for the fifth hole 1026 extending through the center of the fifth hole 1026 to the points on the surfaces of the inner surface 1038 around the hole 1026 and not around the third slots 842.

The sixth diameter 1082 is larger than the fourth diameter 982, allowing for the sliding of the first protrusions into the third slots. Further, the sixth diameter 1082 is less than a first threshold of distance larger than the fourth diameter 982, allowing for the locking of the first protrusions 844 with the inner surfaces 1038 around the third slots 842. Likewise, the seventh diameter 1084 is larger than the fifth diameter 984, allowing for the sliding of the third shoulders 817 and the fourth shoulders 819 into and through the fifth hole 1026. Further, the seventh diameter 1084 is less than a second threshold of distance larger than the fifth diameter 984, such that features of the third shoulders 817 and/or fourth shoulders 819 have surface sharing contact with the inner surfaces 1038 around the fifth hole 1026.

Turning to FIG. 11, it shows a tenth view 1100 of a third differential 1102. The tenth view 1100 is a side view and a perspective view of the third differential 1102. The third differential 1102 is a third example of a differential of the present disclosure, and the third differential 1102 may be or be a part of the differential assembly 400 of FIG. 4.

The third differential 1102 includes a third differential housing 1112 and a third crown gear 1114, where the third crown gear 1114 is rigidly coupled to the third differential housing 1112 via a protrusion-slotted interface (e.g., a protrusion-slotted locking interface), where the protrusions are rigidly coupled to, connected to, or a part of and extend from the third crown gear 1114. The third differential housing 1112 includes at least a plurality mating slots, via which features of the third crown gear 1114, such as the protrusions, may mate with and therein rigidly couple the third crown gear 1114 with the third differential housing 1112.

For example, the mating slots may include at least a plurality of fourth slots 1142. There may be at least two of the fourth slots 1142. The third differential housing 1112 includes a plurality of slots via which the protrusions are insertable into and lock with the third differential housing 1112 via. The slotted-protrusion interface of the third differential 1102 includes at least a plurality of second protrusions 1144 and a plurality of fourth slots 1142. The third crown gear 1114 has at least the fourth slots 1142. The third differential housing 1112 has least the second protrusions 1144. There may be at least two of the fourth slots 1142 and two of the second protrusions 1144.

The third differential housing 1112 may be an example of a center differential housing of the present disclosure, such as a differential case. More specifically the third differential housing 1112 may be a third example of the second differential housing 406 of FIG. 4. The third differential housing 1112 has a plurality of slots, (e.g., the third differential housing 1112 is a slotted differential housing).

The third differential housing 1112 may house a plurality of gears, including a plurality of differential pinion gears, such as spider gears, and side gears of the differential. For example, the third differential housing 1112 may house and support the pinion gears 410 and the side gears 414 of FIG. 4. The side gears may rigidly couple to axle shafts of a larger axle system, such as the axle shafts 416 of FIG. 4.

The third crown gear 1114 (e.g., third crown wheel) may be a third example of the ring gear of the present disclosure, and more specifically the ring gear 402 of FIG. 4. Said in another way, the third crown gear 1114 may be a third example of an input gear to the third differential 1102 and an axle assembly the third differential 1102 may be a part of. The second protrusions 1144 of the third crown gear 1114 may be keys that may insert and mate with the third differential housing 1112. The third crown gear 1114 may include a wall 1132 that a portion of the third differential housing 1112 may extend through via a passage when rigidly coupled. The wall 1132 may have a plurality of surfaces, including a surface 1138 facing out from the first end 504.

The third crown gear 1114 may be a standard bevel gear, and the teeth 525 may be straight teeth extending with and away from a conical surface (e.g., an outer surface of connected to and/or extending from the wall 1132). However, it is to be appreciated that the shape of the teeth 525 of the third crown gear 1114 may be of another configuration. For another example, the third crown gear 1114 may be a spiral bevel gear, and therein the teeth 525 have spiral shaped teeth (e.g., spiral teeth). For another example, the third crown gear 1114 may be a hypoid gear.

With exception to the features of the locking systems, the third crown gear 1114 may have the same features and/or dimensions (e.g., be symmetrical) with the second crown gear 814 and/or the first crown gear 514. Likewise, with exception to the locking features of the locking systems, the third differential housing 1112 may have the same features and/or dimensions with the second differential housing 812 and/or the first differential housing 512.

The surface 1138 may be normal to the axis 412. The wall 1132 may be frustoconical in shape decreasing in diameter, such as closer to the first end 504. The wall 1132 and the surface 1138 may be proportional or be symmetrical with the wall 532 and the surface 538 of FIG. 5 and/or the wall 832 and the surface 838 of FIG. 8, with exception to the shape change from additional features, such as a plurality of sixth shoulders 1119, and the passage of the third crown gear 1114 that portions of the third differential housing 1112 may extend through. The surface 1138 may be contiguous with surfaces of the second protrusions 1144 and the sixth shoulders 1119. The sixth shoulders 1119 may extend in an axial direction from the surface 1138, with respect to the axis 412. Likewise, the sixth shoulders 1119 may curve around the axis 412, such as radially around the axis 412.

The third differential housing 1112 may include a plurality of fifth shoulders 1117, and the third crown gear 1114 may include a plurality of sixth shoulders 1119. The fifth shoulders 1117 may extend outward from the sleeve 516 and, more specifically, radially outward from the sleeve 516. Said in another way, the fifth shoulders 1117 may extend radially above and away from the sleeve 516 with respect to the axis 412. The sixth shoulders 1119 may extend inward toward a passage (e.g., such as a through hole) of the third crown gear 1114 for the sleeve 516, and more specifically radially inward from the wall 1132. Said in another way, the sixth shoulders 1119 may extend radially below and away from the wall 1132 with respect to the axis 412. The sixth shoulders 1119 may also include flanges or flange surfaces, and the sixth shoulders 1119 may extend axially with respect to the axis 412 from the surface 1138. The fifth shoulders 1117 and the sixth shoulders 1119 may contact, such as via having surface sharing contact.

The slots of the third differential housing 1112 include at least a plurality of mating slots that are mateable with features of the third crown gear 1114. For example, the mating slots include the fourth slots 1142. The fourth slots 1142 extend through the third differential housing 1112 (e.g., are through slots) and, more specifically may extend axially with respect to the axis 412 and between the fifth shoulders 1117. A plurality of features of the third crown gear 1114 may mate with and be positioned to extend into the fourth slots 1142, and therein rigidly couple of the third crown gear 1114 to the third differential housing 1112. However, it is to be appreciated that the third differential housing 1112 may include more than mating slots than the fourth slots 1142.

The mating features of the third crown gear 1114 may include the second protrusions 1144 that may mate (e.g., be mateable) with the fourth slots 1142. Said in another way, the second protrusions 1144 may be locking protrusions that lock with features around a volume, such as surfaces arranged around the fourth slots 1142. The second protrusions 1144 may extend radially inward from the wall 1132 toward the axis 412. Further the second protrusions 1144 may extend axially with respect to the axis 412 from the wall 1132 and surface 1138. It is to be appreciated, that the third crown gear 1114 may include more mating protrusions than the second protrusions 1144.

For example, the second protrusions 1144 may be keys (e.g., locking keys) that lock to the fourth slots 1142 and rigidly couple with the fifth shoulders 1117 via insertion and locking with the surfaces of the fifth shoulders 1117 around the fourth slots 1142. Each of the second protrusions 1144 may mate with a slot of the fourth slots 1142. The second protrusions 1144 and the fourth slots 1142 may be mated via sliding the second protrusions 1144 into the fourth slots 1142.

The third differential 1102 may include the fasteners 530. The fasteners 530 may fasten the third crown gear 1114 to the third differential housing 1112. The fasteners 530 may couple the third crown gear 1114 to the third differential housing 1112 such as to reduce movement of the third crown gear 1114 away from the third differential housing 1112 below a threshold of distance. More specifically, when fastened via the fasteners 530, axial movement of the third crown gear 1114 is reduced along the axis 412 from the first end 504 and the third differential housing 1112. The fasteners may extend through the wall 1132 of the third crown gear 1114 and the surface 1138 thereof. Features of the fasteners 530, such as heads thereof, may press against and contact the surface 1138 providing compressive force thereto.

The third crown gear 1114 may have a plurality of fifth slots 1146. The fifth slots 1146 may be wider than the fourth slots 1142. More specifically, the fifth slots 1146 may extend through the third differential housing 1112 between each of the sixth shoulders 1119. Each of the fifth slots 1146 may separate a pair of the sixth shoulders 1119. Likewise, each of the fifth slots 1146 may be arranged around a second protrusion of the second protrusions 1144, with each of the fourth slots having gaps 1152 between, each of the second protrusions and the surfaces of the sixth shoulders 1119 defining and shaping the volume of the fifth slots 1146.

Likewise, the third differential housing 1112 may include a plurality of sixth slots 1148. More specifically, the sixth slots 1148 may extend through the third differential housing 1112 between each of the fifth shoulders 1117. Said in another way, each of the sixth slots 1148 may separate a pair of the fifth shoulders 1117. The sixth slots 1148 may be openings for fluid, such as a coolant and/or lubricant, to be flowed from a first side of the third crown gear 1114, through the wall 1132, and to a second side of the third crown gear 1114, where the second side is opposite the first side across and with respect to the wall 1132. The fluid flowed through the sixth slots 1148 may be oil, where the oil may be used as a coolant and/or lubricant for components and features of the third differential 1102 and other components of an axle system, such as the shafts 416 of FIG. 4.

Turning briefly to FIG. 13, it shows a twelfth view 1300 of the third crown gear 1114. The twelfth view 1300 is a side view and a perspective view of the third crown gear 1114 Additionally, the twelfth view 1300 shows the third crown gear 1114 separate from other components and features of the third differential 1102. More specifically, the twelfth view 1300 shows the third crown gear 1114 separate from the third differential housing 1112 and the bearing assembly 520 of FIG. 11.

The twelfth view 1300 shows that the second protrusions 1144 may have a plurality of grooves 1332. The second protrusions 1144 comprise a plurality of first prongs **1334*a* and a second prongs 1334*b*, where each protrusion of the second protrusions 1144 includes a first prong of the first prongs 1334*a* and a second prong of the second prongs 1334*b*. Each groove of the grooves 1332 may be positioned between a first prong of the first prongs 1334*a* and a second prong of the second prongs 1334*b***, where the first prong and the second prong are on opposite sides of the groove.

The first prongs **1334*a* and the second prongs 1334*b* extend radially inward from the wall 1132 and an inner surface 1342 around the sixth hole 1326, and radially inward toward the sixth hole 1326 and the center thereof. Said in another way the first prongs 1334*a* and the second prongs 1334*b* of each of the second protrusions 1144 extend radially below the wall 1132 and the inner surface 1342. Likewise, the first prongs 1334*a* and the second prongs 1334*b* of each of the second protrusions 1144 may extend radially inward toward the axis 412**.

The grooves 1332 may be additional openings for fluid, such as a coolant and/or lubricant, to be flowed from a first side of the third crown gear 1114 and to a second side of the crown gear 1114, where the second side is opposite the first side across and with respect to the wall 1132. The fluid flowed through the grooves 1332 may be oil, where the oil may be used as a coolant and/or lubricant for components and features of the third differential 1102 and other components of an axle system, such as the shafts 416 of FIG. 4.

The grooves 1332 may be in fluid communication (e.g., fluidically coupled) with the fourth slots 1142, such as when the second protrusions 1144 lock with the third crown gear 1114 via the fourth slots 1142. Fluid flow into and through the fourth slots 1142 may exit the fourth slots via the grooves 1332. Alternatively, fluid flow into and through the fourth slots 1142, may enter the fourth slots 1142 via the grooves 1332.

Returning to FIG. 11, the tenth view 1100 shows the third differential housing 1112 may include a plurality of sixth slots 1148. More specifically, the sixth slots 1148 may extend through the third differential housing 1112 between each of the fifth shoulders 1117. Said in another way, each of the sixth slots 1148 may separate a pair of the fifth shoulders 1117. The sixth slots 1148 may be openings for fluid, such as a coolant and/or lubricant, to be flowed from a first side of the third crown gear 1114, through the wall 1132, and to a second side of the crown gear 1114, where the second side is opposite the first side across from and with respect to the wall 1132. The fluid flowed through the sixth slots 1148 may be oil, where the oil may be used as a coolant and/or lubricant for components and features of the third differential 1102 and other components of an axle system, such as the shafts 416 of FIG. 4. The sixth shoulders 1119 may be around and may define and shape a portion of the volume of the sixth slots 1148.

Turning to FIG. 12, it shows an eleventh view 1200 of the third differential housing 1112. The eleventh view 1200 is a side view and a perspective view of third differential housing 1112. Additionally, the eleventh view 1200 shows the third differential housing 1112 and features and component thereof separate from other components and features of the third differential 1102 of FIG. 11. More specifically, the eleventh view 1200 shows the third differential housing 1112 separate from the third crown gear 1114 and the bearing assembly 520 of FIG. 11.

The third differential housing 1112 includes at least two portions: a first portion 1212 and a second portion 1214. The second portion 1214 extends axially away from the first portion 1212 along a central axis, such as the axis 412. The first portion 1212 may include the body 622 and the end cap 624 rigidly coupled thereto. Further the first portion 1212 and the body 622 includes the second shoulder 632 with a frustoconical shape hosting the surface 634. The second portion 1214 may extend axially along the axis 412 from the surface 634. The second portion 1214 may include the fifth shoulders 1117, a plurality of seventh shoulders 1232, and the sleeve 516.

When rigidly coupled to the third differential housing 1112, the third crown gear 1114 may abut and have surface sharing contact with the second shoulder 632 and, more specifically, the surface 634. For example, the second shoulder 632 may abut and press against the wall 1132 and, more specifically, a surface of the third crown gear 1114 opposite the wall 1132 from the surface 1138 of FIGS. 11 and 13. Said in another way, a surface of the wall 1132 may abut and have surface sharing contact with the second shoulder 632 and the surface 634, where the surface of the wall 1132 is on the opposite side of the wall 1132 from the surface 1138.

The second portion 1214 includes one or more step structures extending radially outward (e.g., radially above) the sleeve 516. For example, the second portion 1214 may include a step structure including the seventh shoulders 1232 and the fifth shoulders 1117. The seventh shoulders 1232 may extend radially outward from the sleeve 516, and the seventh shoulders 1232 may extend radially outward from the fifth shoulders 1117. The seventh shoulders 1232 may be raised from the surface 634. The seventh shoulders 1232 may be recessed axially from the fifth shoulders 1117. The fifth shoulders 1117 may extend through a passage of the third crown gear 1114. Likewise, the seventh shoulders 1232 may abut and have surface sharing contact with features of the third crown gear 1114. For example, the seventh shoulders 1232 may abut, have surface sharing contact with, and press against the sixth shoulders 1119 of FIGS. 11 and 13.

The fasteners 530 of FIGS. 5 and 7 may extend through the second holes 636 and through other holes of the third crown gear 1114. Further, the fasteners 530 may fasten to the body 622 and the second shoulder 632 via the second holes 636. The fasteners 530 may extend through holes of the third crown gear 1114, such as the fourth holes 734, and fasten the third crown gear 1114 to the second shoulder 632 and the surface 634. The fasteners 530 may be passed through the second holes 636 and fastened to the third differential housing 1112 via threading. The fasteners 530 may press the third crown gear 1114 against surface 634, and when fastened the fasteners 530 may reduce movement of the third crown gear 1114 a threshold of distance away from the surface 634 along the axis 412.

The body surfaces of the first portion 1212 defining the volume of the second slots 642 may be connected to the fourth slots 1142 via the first slots 534. For example, one, more, or all of the body surfaces of the second portion 1214 defining the volumes of the first slots 534 may be continuous with body surfaces defining the volumes of the second slots 642. Further, one, more, or all of the body surfaces defining the volumes of the first slots 534 may be continuous or contiguous with the body surfaces defining the volumes of the fourth slots 1142. Therein the first slots 534 may place the second slots 642 in fluidic communication with the fourth slots 1142.

The body surfaces of the first portion 1212 defining the shape of the second slots 642 may be continuous with one, more, or all of the surfaces defining the volumes of the sixth slots 1148. Likewise, the body surfaces may be contiguous with one, more, or all of the surfaces defining the volumes of the sixth slots 1148. The sixth slots 1148 and the second slots 642 may be in fluid communication (e.g., fluidically coupled) such that fluid may flow from the sixth slots 1148 to the second slots 642 and vice versa. The second slots 642 may therein place an inner volume or a plurality of inner volumes of the body 622 in fluid communication with the sixth slots 1148. For example, the first slots 534 may have a shape defined by surfaces continuous and/or contiguous with surfaces of the second slots 642 and the sixth slots 1148.

The second portion 1214 and features thereof may be an eighth diameter 1282 and a ninth diameter 1284. The eighth diameter 1282 is an outer diameter of the second portion 1214 extending across the second portion, through the center of the second portion 1214, the sleeve 516, and the hole 518, and to the edges of the seventh shoulders 1232. Further, the eighth diameter 1282 is the outer diameter of the seventh shoulders 1232. The ninth diameter 1284 is an outer diameter of the fifth shoulders 1117, and extends across the fifth shoulders 1117 to the edges thereof.

The second portion 1214 also includes a tenth diameter 1286. The tenth diameter 1286 may extend across the second portion 1214 from a surface of a fourth slot of the fourth slots 1142 to another surface of another fourth slot of the fourth slots opposite the second portion 1214 from the fourth slot. Said in another way, the tenth diameter 1286 extends between radially inner surfaces (e.g., the radially lowest surfaces relative to the axis 412) of the fourth slots 1142 on opposite sides of the second portion 1214. Further the second portion 1214 also includes an eleventh diameter 1288. The eleventh diameter 1288 extends across the second portion 1214 from a surface of a sixth slot of the sixth slots to another surface of another sixth slot of the sixth slots opposite the second portion from the sixth slot. Said in another way, the eleventh diameter 1288 extends between radially inner surfaces of the sixth slots 1148 on opposite sides of the second portion 1214.

Returning to FIG. 13, the twelfth view 1300 shows the third crown gear 1114 has a sixth hole 1326. The sixth hole 1326 is a through hole extending through the third crown gear 1114, extending through the wall 1132 and the surface 1138 thereof. The sixth hole 1326 may be centrally located to the third crown gear 1114. Said in another way, the sixth hole 1326 may be concentric to the third crown gear 1114. The sixth hole 1326 may be centered around the axis 412 and, more specifically, be positioned radially around the axis 412.

The sleeve 516 and the fifth shoulders 1117 of FIGS. 11-12 may extend through and/or be positioned in a sixth hole 1326 of the third crown gear 1114. The sixth hole 1326 may be the passage described for FIG. 11 the sleeve 516 and fifth shoulder 1117 extend through. Further, the fifth shoulders 1117 may have surface sharing contact with an inner surface or a plurality of inner surfaces of the third crown gear 1114 and, more specifically, the sixth shoulders 1119. The second protrusions extend radially inward from (e.g., radially below) the third crown gear 1114 and toward the center of the sixth hole 1326.

The inner surface 1342 is around and, more specifically, radially around the sixth hole 1326. The inner surface 1342 may curve with, be a part of, and be continuous with other surface of the sixth shoulders 1119. Further, the inner surface 1342 may be contiguous with other surfaces of the sixth shoulders 1119. The inner surface 1342, the second protrusions 1144, the grooves 1332, and the gaps 1152 may define and shape the volume of the sixth hole 1326.

The third crown gear 1114 may have a twelfth diameter 1384 and a thirteenth diameter 1386 that are a first inner diameter and a second inner diameter, respectively, of the third crown gear 1114. The twelfth diameter 1384 is larger than the thirteenth diameter 1386. The twelfth diameter 1384 and the thirteenth diameter 1386 are a maximum diameter and minimum diameter, respectively, for the sixth hole 1326. The twelfth diameter 1384 extends across the sixth hole 1326, and through a center of the sixth hole 1326. The twelfth diameter 1384 extends from a point on the inner surface 1342 to another point on the sixth surface opposite the center of the sixth hole 1326. The thirteenth diameter 1386 extends across the sixth hole 1326. The thirteenth diameter 1386 extends from a first point on a first tip of a second protrusion of the second protrusions 1144 to a second point on a second tip of another second protrusion of the second protrusions 1144 opposite to the second protrusion. More specifically, the thirteenth diameter 1386 extends from tips of the first prongs **1334*a* or the second prongs 1334*b* to tips of other prongs of the first prongs 1334*a* or the second prongs 1334*b* opposite the sixth hole 1326**.

The twelfth diameter 1384 is larger than the ninth diameter 1284 of FIG. 12, allowing for the sixth shoulders 1119 to be positioned around the fifth shoulder 1117 and the fifth shoulder 1117 to be positioned in the sixth hole 1326. The thirteenth diameter 1386 is larger than the tenth diameter 1286 of FIG. 12, allowing the second protrusions 1144 to be slid into, fit to, and lock with the fifth shoulders 1117 via the fourth slots 1142.

FIGS. 8-10 and FIGS. 1-13 may be used to illustrate a method for assembling a first example and a second example of a differential of the present disclosure having a protrusion-slotted interface (e.g., the second differential 802 of FIG. 8 or the third differential 1102 of FIG. 11, respectively) for locking and rigidly coupling a ring gear (e.g., the crown gear 814 of FIGS. 8 and 10 or the crown gear 1114 of FIGS. 11 and 13) to a differential housing (e.g., the second differential housing 812 of FIGS. 8-9 or the third differential housing 1112 of FIGS. 11-12).

The method of assembling a differential that includes a protrusion-slotted interface begins with centering the ring gear and the housing for the differential around a common axis. The common axis may be a rotational axis, for example the axis 412. For a first example, of a differential with a protrusion-slotted interface, the ring gear may include a plurality of first slots and the differential housing may include a plurality of protrusions. For the first example, the ring gear may be the second crown gear 814 and the differential housing may be the first differential housing 512. Likewise, the first slots may be the third slots 842 and the protrusions may be the first protrusions 844. For a second example of a differential with a protrusion-slotted interface, the ring gear may include the protrusion and the differential housing may include the first slots. For the second example, the ring gear may be the third crown gear 1114 and the differential housing may be the third differential housing 1112. Likewise, the first slots may be the fourth slots 1142 and the protrusions may be the second protrusions 1144.

For both examples, a plurality of differential gears, including side gears and differential pinion gears (e.g., spider gears) are pre-assembled into the differential housing such as to be supported and housed via the differential housing. For another example of either of the first or second example, the centering the differential housing and the ring gear around a common axis may be proceeded or followed by assembling the side gears and the differential pinion gears within the differential housing such as to be supported and housed thereby.

The method continues by positioning the ring gear to be arranged around a second portion of the housing, where the second portion extends axially with respect to the axis from a first portion of the housing, the first portion having first width larger than an outer diameter of the second portion, and the ring gear having an inner diameter larger than the outer diameter. The positioning is such that a hole or another passage through the ring gear (e.g., the fifth hole 1026 or the sixth hole 1326) has an area superimposed over the first portion and the second portion, such that a threshold of area of a first area of the passage overlaps with a second area of the second portion. The threshold of area may be approximately all of the second area such that the second portion fits within the passage through the ring gear. Said another way, the method includes positioning the second portion to be within the inner diameter on parallel planes.

For the first example, first portion and the second portion may be the first portion 912 and the second portion 914, respectively, of FIG. 9. Likewise, there may be plurality of inner diameters including a sixth diameter 1082 for the slots and seventh diameter 1084 of FIG. 10 and there may be a plurality of outer diameters that may be the fourth diameter 982 and the fifth diameter 984 of FIG. 6. The sixth diameter 1082 is larger than the fourth diameter 982 allowing for protrusions to fit to the slots. Likewise, the seventh diameter 1084 is larger than the fifth diameter 984 allowing for the shoulders of the second portion to fit to the hole.

For the second example, first portion and the second portion may be the first portion 1212 and the second portion 1214, respectively, of FIG. 12. Likewise, the inner diameter may be the twelfth diameter 1384 of FIG. 13 and there may be a plurality of outer diameters that may be the eighth diameter 1282 and the ninth diameter 1284 of FIG. 12. The twelfth diameter 1384 is larger than the ninth diameter 1284 allowing for the second portion to fit to the hole of the ring gear.

After positioning the ring gear, the method includes further positioning of a plurality of first holes of the differential housing and a plurality of second holes of the ring gear to align. Aligning includes positioning each the first holes to be around a common axis with a second hole of the second holes. Additionally, aligning includes overlapping each of a plurality of third areas of the first holes with each of a plurality fourth areas of the second holes, via a second threshold of area. For an example, the first holes may be a larger diameter than the second holes, and the second threshold of area may be approximately all of the fourth area. For another example, the second holes may be a larger diameter than the first holes, and the second threshold of area may be approximately all of the third area. The first holes and the second holes are holes for fasteners, that the fasteners may be extended through in further phases of the method to fasten the ring gear to the differential housing. The first holes and the second holes may be the second holes 636 of FIG. 6 and the fourth holes 734 of FIG. 7, respectively.

After positioning, the method includes advancing the ring gear toward the second portion or advancing the second portion toward the ring gear along the common axis, such that the first portion extends through the passage extending through the ring gear.

The method includes mating a plurality of first mateable features of the second portion with a plurality of second mateable features of the ring gear, where the first mateable features and second mateable features include a plurality of protrusions and a plurality of spaces between features of the differential.

For the first example, the first mateable features and the protrusions are connected or coupled to the second portion, where the protrusions extend radially outward from (e.g., radially above) the sleeve of the second portion and extend axially with and from features of the second portion of the differential housing. The second mateable features include the first slots, and the first slots extend radially outward (e.g., radially above) an inner surface of the ring gear around the passage through the ring gear. More specifically, the protrusions may be the first protrusions 844 and the first slots may be the third slots 842. The method includes sliding the protrusions into the first slots, and abutting first surfaces of the protrusions against second surfaces defining the shape of the first slots, locking the protrusions with the ring gear.

For a second example, the first mateable features are first slots of the differential housing extend radially inward from (e.g., radially below) an outer surface of the second portion. Likewise, the second mateable features are the protrusions connected or coupled to the ring gear, where the protrusions are extending radially inward (e.g., radially below) an inner surface of the ring gear around the passage through the ring gear. More specifically, the protrusions are the second protrusions 1144 and the first slots are the fourth slots 1142. The method includes sliding the protrusions into the first slots, and abutting first surfaces of the protrusions against second surfaces defining the shape of the first slots, locking the protrusions with the second portion and differential housing.

The method includes positioning a plurality of second slots (e.g., the first slots 534 of FIGS. 8-9 and 11-12) of the second portion to be within the inner diameter, and placing an inner volume of the housing in fluidic communication with a first side of the ring gear opposite to a second side of the ring gear facing the first portion. Positioning may include advancing the second portion toward the hole to within a threshold of distance. The first slots are within the inner diameter on parallel planes. The first slots are advanced toward the hole and within the diameter. Further, a wall of the ring gear is arranged around the first slots.

The method includes stopping the translation of the differential housing or the ring gear by abutting the wall of the ring gear against a surface and a shoulder of the differential housing, such as the surface 634 and the second shoulder 632 of FIG. 9 and FIG. 12. The contact with the shoulder prevents movement of the ring gear in a first direction parallel with the central axis or movement of the differential housing separate from the ring gear in a second direction parallel with the central axis, where the first direction is opposite to the second direction. Upon contact between the shoulder and the ring gear, the method may include fixing the ring gear in place against the housing using a temporary fixture system or fastening system, such as clamps.

After abutting and fixing the ring gear against the shoulder of the housing, the method includes fastening the ring gear to the first portion of the differential housing via a plurality of fasteners. Fastening may include extending the fasteners through a first holes of the ring gear and the second holes of the differential housing, and fastening the ring gear against the first portion via the fasteners, the first holes, and second holes. Fastening may include threading the fasteners through the first holes and/or second holes. Further fastening may include pressing heads or other features of the fasteners against the wall of the ring gear creating a compressive force thereto. Fastening via the fasteners reduces movement of the differential housing from the ring gear and movement of the ring gear from the differential housing to a threshold of distance in the first direction or the second direction.

After fastening the ring gear to the differential housing via the fasteners the first example and second example of the method end.

Additionally, an alternate example of the method may include arranging the differential after assembly into a second differential housing, such as a differential carrier of a drive axle assembly. Further the method includes rigidly coupling the axle shafts of the drive axle assembly to the side gears housed and supported via the first differential housing.

After rigidly coupling the axle shafts to side gears of the differential housing, the alternate example of the method ends.

The technical effect of the differential systems and assemblies, and the locking interfaces thereof, described herein is to increase the mechanical strength (e.g., the tensile strength, compressive strength, sheer strength, etc.) of locking interfaces and coupling between crown gear and a differential housing compared to a differential system that uses only fasteners for coupling. Further, another technical effect locking system is to reduce the modes of degradation, such as fraying, to components and features of the differential system, such as reducing degradation to the crown gear, the differential housing, and a plurality of fasteners coupling the crown gear to the differential housing. Additionally, another technical effect of the locking system is to decrease the number of components, such as the fasteners, used during assembly and potentially reduce the time for manufacturing or disassembling the differential system.

The disclosure also provides support for a differential assembly comprising: a housing comprising a first portion and a second portion axially protruding from the first portion, a crown gear, where the crown gear is fixed to the first portion of the housing via a plurality of fasteners and fixed to the second portion of the housing via a splined interface between an inner diameter of the crown gear and an outer diameter of the second portion of the housing, and a driveshaft, where the crown gear is physically decoupled from the driveshaft. In a first example of the system, the housing comprises a plurality of slots that are positioned within the inner diameter of the crown gear, placing a side of the of the crown gear in fluid communication with the slots. In a second example of the system, optionally including the first example, an inner volume of the housing is in fluid communication with the crown gear via the slots. In a third example of the system, optionally including one or both of the first and second examples, the slots are configured to enable lubricant to flow therethrough to lubricate a plurality of gears of the differential assembly. In a fourth example of the system, optionally including one or more or each of the first through third examples, a plurality of splines of the splined interface and the crown gear are arranged around a through hole of the crown gear. In a fifth example of the system, optionally including one or more or each of the first through fourth examples, the second portion includes a sleeve extending from one or more shoulders, and the sleeve supports an axle shaft. In a sixth example of the system, optionally including one or more or each of the first through fifth examples, the housing houses a plurality of side gears and differential gears. In a seventh example of the system, optionally including one or more or each of the first through sixth examples, a bearing assembly is positioned around the first portion, allowing the housing to rotate independently of another housing there-around. In an eighth example of the system, optionally including one or more or each of the first through seventh examples, the fasteners are bolts or screws. In a ninth example of the system, optionally including one or more or each of the first through eighth examples, the housing is a differential case. In a tenth example of the system, optionally including one or more or each of the first through ninth examples, teeth of the crown gear are arranged to extend toward the first portion. In an eleventh example of the system, optionally including one or more or each of the first through tenth examples, the splined interface is arranged around a through hole of the crown gear.

The disclosure also provides support for a differential assembly comprising: a housing comprising a first portion and a second portion axially protruding from the first portion, a crown gear, where the crown gear is fixed to the second portion of the housing via a protrusion-slotted interface between an inner diameter of the crown gear and an outer diameter of the second portion of the housing, where the protrusion-slotted interface includes a plurality of protrusions protruding axially and a plurality of first slots, the protrusions extending into and locking with the first slots, and a driveshaft, where the crown gear is physically decoupled from the driveshaft. In a first example of the system, the protrusions rigidly couple to second portion and the crown gear includes the slots. In a second example of the system, optionally including the first example, the crown gear includes a plurality of shoulders, where the slots are between the shoulders, and the protrusions contact and lock against surfaces of the shoulders. In a third example of the system, optionally including one or both of the first and second examples, the second portion comprises the protrusions. In a fourth example of the system, optionally including one or more or each of the first through third examples, the protrusions rigidly couple to the crown gear and the second portion includes the slots. In a fifth example of the system, optionally including one or more or each of the first through fourth examples, the second portion includes a plurality of shoulders, where the slots are between the shoulders, and the protrusions contact and lock against surfaces of the shoulders. In a sixth example of the system, optionally including one or more or each of the first through fifth examples, the crown gear includes the protrusions. In a seventh example of the system, optionally including one or more or each of the first through sixth examples, the protrusions include a plurality of grooves, where lubricant is flowable via the grooves between a first side and a second side of the crown gear, where the first side is opposite the second side. In an eighth example of the system, optionally including one or more or each of the first through seventh examples, the crown gear is fixed to the first portion of the housing via a plurality of fasteners. In a ninth example of the system, optionally including one or more or each of the first through eighth examples, the housing includes a plurality of second slots, the second slots are within the inner diameter, and fluid is flowable from the housing to a first side of the crown gear, where the first side of the crown gear is opposite a wall of the crown gear from a second side facing the housing. In a tenth example of the system, optionally including one or more or each of the first through ninth examples, the second portion comprises the protrusions. In an eleventh example of the system, optionally including one or more or each of the first through tenth examples, the crown gear includes the protrusions. In a twelfth example of the method, optionally including one or more or each of the first through eleventh examples, the housing is a differential case.

The disclosure also provides support for a vehicle comprising: a prime mover, a drive shaft, a drive axle, and a differential assembly, where the differential assembly is part of the drive axle and comprises: a housing comprising a first portion and a second portion axially protruding from the first portion, and a crown gear fixed to the first portion of the housing via a plurality of fasteners and fixed to the second portion of the housing via a splined-slotted interface or a protrusion-slotted interface between an inner diameter of the crown gear and an outer diameter of the second portion of the housing, where the crown gear is physically decoupled from the drive shaft.

Further, in another representation, the disclosure also provides support for a method for assembling a differential including: centering a housing for the differential and a ring gear around an axis, positioning the ring gear around a second portion of the housing, where the second portion extends axially with respect to the axis from a first portion of the housing, the first portion having first width larger than an outer diameter of second portion, and the ring gear having an inner diameter larger than the outer diameter, positioning a plurality of first slots of the second portion to be within the inner diameter, and placing an inner volume of the housing in fluidic communication with a first side of the ring gear opposite to a second side of the ring gear facing the first portion, mating a plurality of first mateable features of the second portion with a plurality of second mateable features of the ring gear, where the first mateable features and second mateable features include a plurality of protrusions and a plurality of spaces between features of the differential, abutting the ring gear against the first portion of the housing, and fastening the ring gear to the first portion via a plurality of fasteners. In a first example of the method, the protrusions are a plurality of first splines extending radially outward from the second portion and axially along the second portion, and the spaces are between a plurality of second splines of the ring gear, and includes sliding the first splines between the second splines mating the splines and rigidly coupling the ring gear to the second portion. In a second example of the method, optionally including the first example, includes translating the ring gear or the housing, sliding the protrusions into a plurality of second slots, where the protrusions are extending axially. In a third example of the method, optionally including one or both of the first and second examples, protrusions extend from and are connected to the second portion, where the ring gear includes the second slots, and includes sliding and locking the protrusions into contact with surfaces of the ring gear around the second slots. In a fourth example of the method, optionally including one or more or each of the first through third examples, protrusions extend from and are connected to the ring gear, where the second portion includes the slots, and includes sliding and locking the protrusions into contact with surfaces of the second portion around the second slots.

FIGS. 2-13 are drawn approximately to scale, aside from the schematically depicted components. However, other relative component dimensions may be used, in other embodiments.

FIGS. 1-13 show example configurations with relative positioning of the various components. If shown directly contacting each other, or directly coupled, then such elements may be referred to as directly contacting or directly coupled, respectively, at least in one example. Similarly, elements shown adjacent or contiguous to each other may be adjacent or contiguous to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown below/above one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" may be construed to mean plus or minus five percent or less of the range or value unless otherwise specified.

The control methods and routines disclosed herein may be stored as executable instructions in non-transitory memory and may be carried out by a drive axle system or vehicle system that includes the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

It will be appreciated that the configurations disclosed herein are exemplary in nature, and that these specific examples are not to be considered in a limiting sense, because numerous variations are possible. For example, the above technology can be applied to axle assemblies that include different types of propulsion sources including different types of electric machines and/or combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A differential assembly comprising:

a housing comprising a first portion and a second portion axially protruding from the first portion;

a crown gear, where the crown gear is fixed to the first portion of the housing via a plurality of fasteners and fixed to the second portion of the housing via a splined interface between an inner diameter of the crown gear and an outer diameter of the second portion of the housing; and a driveshaft, where the crown gear is physically decoupled from the driveshaft, where the housing comprises a plurality of slots that are positioned within the inner diameter of the crown gear, placing a side of the of the crown gear in fluid communication with the slots.

2. The differential assembly of claim 1, where an inner volume of the housing is in fluid communication with the crown gear via the slots.

3. The differential assembly of claim 2, where the slots are configured to enable lubricant to flow therethrough to lubricate a plurality of gears of the differential assembly.

4. The differential assembly of claim 1, where a plurality of splines of the splined interface and the crown gear are arranged around a through hole of the crown gear.

5. The differential assembly of claim 1, where the second portion includes a sleeve extending from one or more shoulders, and the sleeve supports an axle shaft.

6. The differential assembly of claim 1, where the housing houses a plurality of side gears and differential gears.

7. The differential assembly of claim 1, where a bearing assembly is positioned around the first portion, allowing the housing to rotate independently of another housing therearound.

8. The differential assembly of claim 1, where the fasteners are bolts or screws.

9. A differential assembly comprising:

a housing comprising a first portion and a second portion axially protruding from the first portion;

a crown gear, where the crown gear is fixed to the second portion of the housing via a protrusion-slotted interface between an inner diameter of the crown gear and an outer diameter of the second portion of the housing, where the protrusion-slotted interface includes a plurality of protrusions protruding axially and a plurality of first slots, the protrusions extending into and locking with the first slots; and a driveshaft, where the crown gear is physically decoupled from the driveshaft, where the protrusions rigidly couple to second portion and the crown gear includes the slots, where the crown gear includes a plurality of shoulders, where the slots are between the shoulders, and the protrusions contact and lock against surfaces of the shoulders.

10. The differential assembly of claim 9, where the second portion comprises the protrusions.

11. The differential assembly of claim 9, where the protrusions rigidly couple to the crown gear and the second portion includes the slots.

12. The differential assembly of claim 11, where the second portion includes a plurality of shoulders, where the slots are between the shoulders, and the protrusions contact and lock against surfaces of the shoulders.

13. The differential assembly of claim 11, where the crown gear includes the protrusions.

14. The differential assembly of claim 11, where the protrusions include a plurality of grooves, where lubricant is flowable via the grooves between a first side and a second side of the crown gear, where the first side is opposite the second side.

15. The differential assembly of claim 9, where the crown gear is fixed to the first portion of the housing via a plurality of fasteners.

16. The differential assembly of claim 9, where the housing includes a plurality of second slots, the second slots are within the inner diameter, and fluid is flowable from the housing to a first side of the crown gear, where the first side of the crown gear is opposite a wall of the crown gear from a second side facing the housing.

17. A vehicle comprising:

a prime mover;

a drive shaft;

a drive axle; and a differential assembly, where the differential assembly is part of the drive axle and comprises:

a housing comprising a first portion and a second portion axially protruding from the first portion; and a crown gear directly fixed to the first portion of the housing via a plurality of fasteners and fixed to the second portion of the housing via a splined interface or a protrusion-slotted interface between an inner diameter of the crown gear and an outer diameter of the second portion of the housing, where the crown gear is physically decoupled from the drive shaft, and wherein the housing comprises a plurality of slots that are positioned within the inner diameter of the crown gear, placing a side of the crown gear in fluid communication with the slots.

* * * * *